United States Patent
Noda et al.

(10) Patent No.: US 8,726,153 B2
(45) Date of Patent: May 13, 2014

(54) MULTI-USER NETWORKED DIGITAL PHOTO DISPLAY WITH AUTOMATIC INTELLIGENT ORGANIZATION BY TIME AND SUBJECT MATTER

(75) Inventors: Takuro Noda, Tokyo (JP); QiHong Wang, Tokyo (JP); Akiko Terayama, Tokyo (JP); Takuo Ikeda, Tokyo (JP); Hidenori Karasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 12/328,428

(22) Filed: Dec. 4, 2008

(65) Prior Publication Data
US 2009/0150772 A1    Jun. 11, 2009

(30) Foreign Application Priority Data

Dec. 7, 2007    (JP) ................................ P2007-317483

(51) Int. Cl.
*G06F 17/30*    (2006.01)
*G06F 17/22*    (2006.01)

(52) U.S. Cl.
CPC ................................ *G06F 17/30905* (2013.01)
USPC ........................................ 715/277; 715/273

(58) Field of Classification Search
CPC ................................................ G06F 17/30905
USPC .................. 715/201–205, 720–725, 273–277
See application file for complete search history.

(56) References Cited

U.S. PATENT DOCUMENTS

| | | | |
|---|---|---|---|
| 6,006,227 A * | 12/1999 | Freeman et al. | 707/695 |
| 6,253,218 B1 * | 6/2001 | Aoki et al. | 715/201 |
| 6,597,378 B1 * | 7/2003 | Shiraishi et al. | 715/764 |
| 6,990,637 B2 * | 1/2006 | Anthony et al. | 715/851 |
| 7,607,150 B1 * | 10/2009 | Kobayashi et al. | 725/41 |
| 7,712,052 B2 * | 5/2010 | Szeliski et al. | 715/854 |
| 7,716,604 B2 * | 5/2010 | Kataoka et al. | 715/835 |
| 7,774,431 B2 * | 8/2010 | Conn et al. | 709/219 |

(Continued)

FOREIGN PATENT DOCUMENTS

| | | |
|---|---|---|
| JP | 8-171471 | 7/1996 |
| JP | 10-187743 | 7/1998 |

(Continued)

OTHER PUBLICATIONS

The Essentials of Multicam Editing in Final Cut Pro by Steve Martin (available at as of Jun. 5, 2006).*

*Primary Examiner* — William Bashore
*Assistant Examiner* — Nathan Shrewsbury
(74) *Attorney, Agent, or Firm* — Finnegan, Henderson, Farabow, Garrett & Dunner, L.L.P.

(57) ABSTRACT

A display device for displaying a plurality of contents in a predetermined display area. The display device includes a content acquiring unit configured to acquire the contents, a content arranging unit configured to arrange the contents based on time information possessed by the contents, a time difference calculating unit configured to calculate a time difference between adjacent contents in terms of time based on the time information possessed by the contents, a display position setting unit configured to set a position of each content along a time axis based on the time difference between the contents, the display position setting unit determining whether the time difference between the contents is larger than a predetermined value, and a content display unit configured to display the plurality of contents based on position information on the time axis along the depth direction of the predetermined display area.

12 Claims, 16 Drawing Sheets

(56) References Cited

U.S. PATENT DOCUMENTS

| | | |
|---|---|---|
| 7,979,879 B2 * | 7/2011 | Kazama et al. .................. 725/41 |
| 8,151,185 B2 * | 4/2012 | Audet ............................ 715/237 |
| 2001/0019620 A1 * | 9/2001 | Nagai et al. .................... 382/104 |
| 2003/0149939 A1 * | 8/2003 | Hubel et al. ................... 715/526 |
| 2004/0130566 A1 * | 7/2004 | Banerjee et al. .............. 345/716 |
| 2005/0289482 A1 * | 12/2005 | Anthony et al. ............... 715/851 |
| 2006/0156259 A1 * | 7/2006 | Wagner et al. ................ 715/963 |
| 2006/0212833 A1 * | 9/2006 | Gallagher et al. ............ 715/848 |
| 2007/0253025 A1 * | 11/2007 | Terayoko ..................... 358/1.16 |
| 2008/0028341 A1 * | 1/2008 | Szeliski et al. ................ 715/854 |
| 2008/0031543 A1 * | 2/2008 | Nakajima et al. ............. 382/284 |
| 2008/0250332 A1 * | 10/2008 | Farrell et al. .................. 715/753 |

FOREIGN PATENT DOCUMENTS

| | | |
|---|---|---|
| JP | 10-320167 | 12/1998 |
| JP | 2002-74322 | 3/2002 |
| JP | 2003-85530 | 3/2003 |
| JP | 2003-216927 | 7/2003 |
| JP | 2004-12651 | 1/2004 |
| JP | 2005-32219 | 2/2005 |

* cited by examiner

MULTI-USER NETWORKED DIGITAL PHOTO DISPLAY WITH AUTOMATIC INTELLIGENT ORGANIZATION BY TIME AND SUBJECT MATTER

CROSS REFERENCES TO RELATED APPLICATIONS

The present invention contains subjected matter related to Japanese Patent Application JP 2007-317483 filed in the Japan Patent Office on Dec. 7, 2007, the entire contents of which being incorporated herein by reference.

BACKGROUND OF THE INVENTION

1. Field of the Invention

The present invention relates to a display device, a display method and a program.

2. Description of the Related Art

With information processing technology and communication technology advanced rapidly in recent years, sharing of contents possessed by individual persons through a network has been achieved. For example, user uploads pictures and moving picture data which he or she takes during an excursion with friends or family to a content sharing server so that the contents located on the content sharing sever can be viewed by his or her friends or family members. Under such an application condition, each user views a desired content with reference to picture taking dates of the uploaded contents or classifies them. For the reason, the contents on the content sharing server are preferred to be displayed in time series by users.

Usually, pictures and moving picture data taken with a digital camera or digital video camera record each picture taking date or time information relating to the taking of pictures. Thus, technology for displaying the contents in time series based on the time information has been developed. For example, Japanese Patent Application Laid-Open No. 2002-74322 has described a technology for expressing cyclic time concept based on the time information contained in the contents such as picture or information such as a related comment. This technology concerns a display method for visually displaying a time concept having periodicity such as four seasons and morning, day, and night and its display technology.

SUMMARY OF THE INVENTION

If the technology described in the Japanese Patent Application Laid-Open No. 2002-74322 is used, the cyclic time concept can be expressed. For the reason, the invention excels in that it can evoke a sensation which can hardly be conveyed by the pictures completely through the cyclic time concept. However, this technology is not suitable for a case where a plurality of users view shared contents using time information as a key. Although the method of arranging pictures in a flat form on a screen secures a high level perspective, it is difficult to recognize a linkage among contents with the time information used as a key or an interval between picture taking dates.

Thus, a method of displaying pictures at an equal interval in the order of picture taking time or a method of arranging pictures at an interval proportional to the picture taking interval can be considered as an example. However, when such a method is used, if a time period when no picture is taken is included in pictures, a unity of the taken pictures is difficult to recognize. Thus, a method of controlling the taken contents by grouping into a predetermined unit can be considered. For example, by controlling the pictures in the unit of an album, the pictures can be viewed while recognizing the unity of each album. However, when a plurality of users participate in the same event and take pictures or moving pictures together, if they desire to share the pictures and moving pictures so as to control those, the pictures and moving pictures are controlled in the unit of each user's album. Consequently, the pictures and moving pictures can hardly be viewed commonly among the users without recognizing each user's album.

Accordingly, the present invention has been made in views of the above-described issues and it is desirable to provide a novel and improved display device and display method which allow users to recognize a unity of the contents on the time base easily when they view the contents, and a program therefor.

In order to solve the above issue, according to an embodiment of the present invention, there is provided a display device for displaying a plurality of contents in a predetermined display area. The display device includes: a time difference calculating unit for calculating a time difference between the contents adjacent in terms of time based on time information possessed by the contents; and a content display unit for displaying the plurality of contents at an interval corresponding to the time difference along the depth direction of the predetermined display area.

As described above, the time difference calculating unit calculates a time difference between the contents adjacent in terms of time based on the time information possessed by the content. The content display unit displays the plurality of contents at a time interval corresponding to the time difference along the depth direction of the predetermined display area. With such a configuration, a unity between the contents on the time base can be grasped intuitively.

If the plurality of contents is divided to the plurality of groups, the content display unit may display the plurality of contents corresponding to the groups along the depth direction of the predetermined display area provided for each group, based on a common time axis among the groups. With such a structure, contents of different groups can be viewed by traversing the groups while a distinction between the groups is grasped. Consequently, the unity of the contents grasped on the time base can be grasped about each group.

The display device may further include a gravity center calculating unit for calculating the gravity center of the content. The content display unit may display the content so that the gravity center of the content calculated by the gravity center calculating unit agrees with the gravity center of the predetermined display area. With such a structure, even if the shape of the display area is irregular, the content can be displayed at an appropriate position of each display area.

If the time difference is larger than a predetermined value, the content display unit may display the contents at a shorter time interval than an interval corresponding to the time difference. With such a structure, the contents displayed such that they are extended meaninglessly in terms of time can be changed into a display easier to see.

If the time difference is smaller than the predetermined value, the content display unit may display the contents at a longer time interval than the interval corresponding to the time difference. With such a structure, the contents displayed densely in terms of time can be changed into a display easier to see.

The content display unit may display the content in a smaller size as the time difference is increased. With such a structure, the contents displayed in each display area are displayed in a perspective fashion, so that user can grasp the time information more intuitively.

In order to solve the above issue, according to another embodiment of the present invention, there is provided a display method for displaying a plurality of contents in a predetermined display area. The display method includes the steps of: calculating a time difference between the contents adjacent in terms of time based on time information possessed by the contents; and displaying the plurality of contents at an interval corresponding to the time difference along the depth direction of the predetermined display area.

As described above, in the time difference calculating step, the time difference between the contents adjacent to each other in terms of time is calculated based on the time information possessed by the contents. In the content display step, the plurality of contents are displayed at an interval corresponding to the time difference along the depth direction of the predetermined display area. With such a structure, the unity of the contents grasped on the time base can be grasped intuitively.

In order to solve the above issue, according to another embodiment of the present invention, there is provided a program allowing a computer to realize a function of displaying a plurality of contents in a predetermined display area. The program includes: a time difference calculating function for calculating a time difference between the contents adjacent in terms of time based on time information possessed by the contents; and a content display function for displaying the plurality of contents at an interval corresponding to the time difference along the depth direction of the predetermined display area.

As described above, the time difference calculating function calculates the time difference between the contents adjacent to each other in terms of time based on the time information possessed by the contents. The content display function displays the plurality of contents at an interval corresponding to the time difference along the depth direction of the predetermined display area. With such a structure, user can grasp the unity of the contents grasped on the time base intuitively.

In order to solve the above issue, according to another embodiment of the present invention, there is provided a graphical user interface which allows user to continuously recognize a positional relationship between the contents displayed in respective display areas while the display areas are being modified when the display style is changed. The graphical user interface concerns a shape modification method for the display area in which a content is to be displayed, wherein when the modification of the shape is carried out between a substantially rectangular first shape extending in one direction and a second shape sectioned by a pair of border lines extending radially from a reference point in a screen, the display area is modified so that a pair of bent units agree with the reference point while the other bent units for forming the display area of the first shape agree with end units of the border lines other than the reference point. In the meantime, "agree with" is used in the above description, however if user can recognize that they agree with each other when he or she sees, a slight separation can be regarded as a substantial agreement. Thus, such a case belongs to the technical scope described above.

In the graphical user interface, when the modification of the shape occurs between the first display area and the second display area, the bent units may be moved through a trajectory which minimizes a change of distance between a central point and the bent unit with respect to the predetermined central point set in the screen. Further, for the pair of the bent units moved so as to agree with the reference point and the other bent units moved so as to agree with the end units of the border line different from the reference point, different central points may be set up. Further, in the graphical user interface, the central point for determining a moving trajectory of the bent unit may be changed over corresponding to in which quadrant the bent unit is located with respect to the center of the screen.

In the display area of the first shape, a plurality of contents may be arranged in time series along the aforementioned direction. If the display area is modified to the second shape, the display positions of the respective contents may be changed so that they are arranged in time series along the depth direction of the screen. Further, the display positions of the respective contents may be changed so that the relation in terms of a distance between the contents arranged along the aforementioned direction in the display area of the first shape corresponds to the relation in terms of a distance between the contents arranged along the depth direction of the screen in the display area of the second shape.

If the above-described graphical user interface is applied, the positional relation among the contents displayed in respective display areas is changed seamlessly when the shapes of the display areas are changed between the first shape and the second shape. Thus, user can trace the positional relationship of a content or a content group which he or she pays attention to visually even if the shape of the display area is changed. As a result, user can hardly lose a relation in terms of time among the contents arranged in time series corresponding to the time information of the content before and after the shape of the display area is changed, so that he or she can continue to recognize an unity of the contents on the time base.

According to the embodiments of the present invention described above, user who views any content can recognize a unity of contents on the time base easily.

DETAILED DESCRIPTION OF THE PREFERRED EMBODIMENTS

Figure 1:
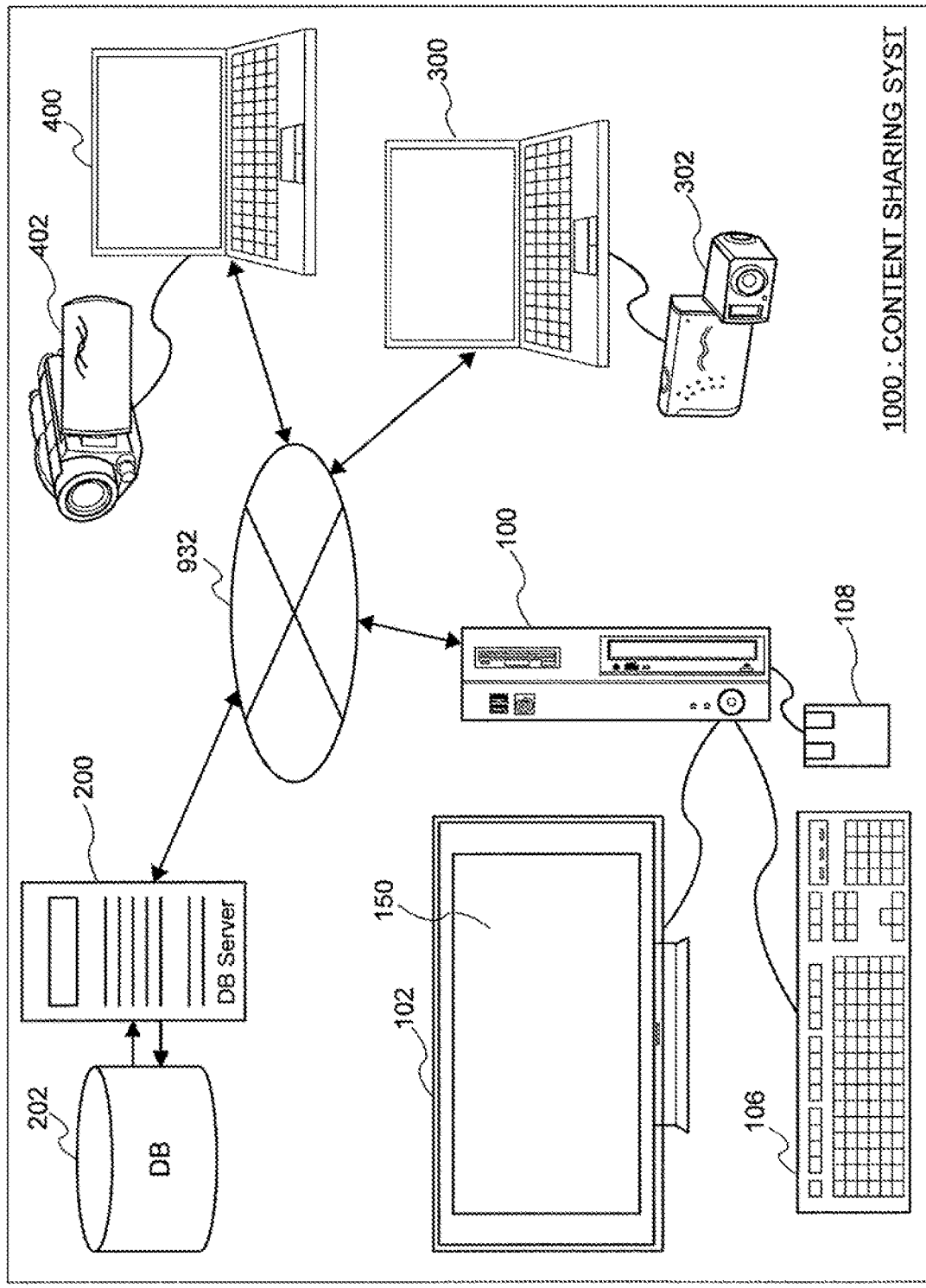
FIG. 1 is an explanatory diagram showing a system configuration of a content sharing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

The first embodiment according to the present invention will be described. This embodiment concerns a technology for making user recognize a feeling of a unity of pictures on the time base by, when a plurality of contents are arranged in a predetermined direction on the time base, adjusting an arrangement interval between the contents based on the information of a time when the content is acquired. Although an example of applying the technology according to this embodiment to picture will be described for convenience for explanation, the contents to which the technology according to this embodiment can be applied is not limited to this example. For example, the technology according to this embodiment is applied to various still pictures, moving pictures, music content icons and other thumbnail images.

[System Configuration]

First, the system configuration of a content sharing system 1000 according to this embodiment will be described with reference to FIG. 1. FIG. 1 is an explanatory diagram showing the system configuration of the content sharing system 1000 according to this embodiment.

As shown in FIG. 1, the content sharing system 1000 includes a plurality of information processing apparatuses 100, 300, 400 and a database server 200. The plurality of information processing apparatuses 100, 300, 400 and the database server 200 are connected to one another through a network 932. In the meantime, the network 932 may be a one-way connecting communication network or bidirectional communication network or further a local area communication network such as local area network (LAN) or a wide area communication network such as Internet.

The information processing apparatuses 100, 300, 400 are an example of user terminals. For example, input devices 106, 108 such as a keyboard and a mouse are connected to the information processing apparatus 100. Further, a display unit 102 having a display screen 150 is connected to the information processing apparatus 100. Thus, the information processing apparatus 100 is an example of the display control device for displaying a content and information relating to the content on the display unit 102.

An image pickup device 302 can be connected to the information processing apparatus 300 so as to acquire picture data taken by the image pickup device 302. The information processing apparatus 300 is connected to the database server 200 through a network 932, so that picture taken by the image pickup device 302 can be uploaded to the data server 200. An image pickup device 402 can be connected to the information processing apparatus 400 so as to acquire moving picture data and still picture data taken by the image pickup device 402. The information processing apparatus 400 is connected to the database server 200 through the network 932, so that moving picture data and still picture data taken by the image pickup device 402 can be uploaded to the database server 200.

The database server 200 is connected to a database (DB) and can store such contents as picture, moving picture data, still picture data uploaded by the information processing apparatuses 100, 300, 400 in the database 202. The function of the database 202 is realized by a storing device installed inside or outside the database server 200. The database server 200 can publicize the contents stored in the database 202 so that the contents can be viewed through the information processing apparatuses 100, 300, 400.

The database server 200 has a function for sharing the contents stored in the database 202 among the plurality of information processing apparatuses 100, 300, 400. Using this function, the information processing apparatus 100 can view a picture taken by user of the information processing apparatus 300 or reproduce a moving picture taken by user of the information processing apparatus 400. Further, using this function, the information processing apparatuses 100, 300, 400 can access the database server 200 at the same time so as to view an uploaded content at the same time.

Each user can view any content uploaded in the database server 200 in an arbitrary time period regardless of a time when other user makes access thereto. The content providing system 1000 may be so configured that the information processing apparatuses 100, 300, 400 provide a function of the database server 200 instead of the database server 200. The information processing apparatus 100 may possess part or all of the functions which the information processing apparatuses 300, 400 have. The content sharing system 1000 may be configured in any fashion as long as contents can be shared among users and the system configuration can be changed appropriately depending on a specific application style.

The system configuration of the content sharing system 1000 according to this embodiment has been described briefly above. As described above, the content sharing system 1000 provides functions for viewing or acquiring a shared content controlled by the database server 200 from a user terminal of the information processing apparatuses 100, 300, 400 or exchanging information relating to each shared content to user.

The function of mainly the information processing apparatus 100 will be described below. FIG. 1 shows a system configuration exemplified for convenience for description and the style of the information processing apparatuses, 100, 300, 400, and the database server 200 is not limited to this example. As the information processing apparatuses, 100, 300, 400, for example, a portable phone, game machine, home information appliance, portable terminal, camera, video camera, digital TV, recorder and other electronic appliances are used.

[Information Processing Apparatus 100 (Display Control Device)]

Figure 2:
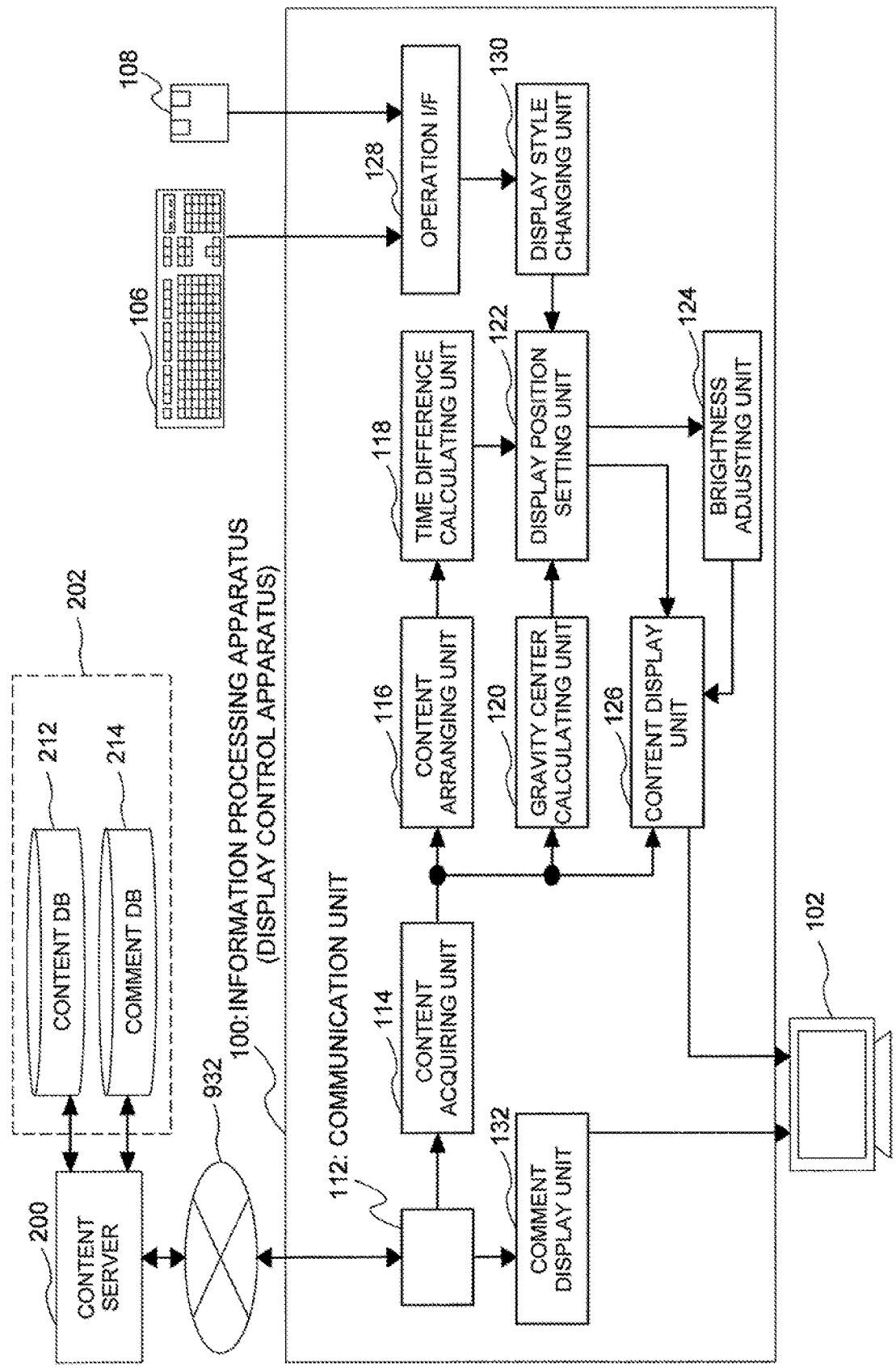
FIG. 2 is an explanatory diagram showing a functional configuration of a display control device according to the embodiment.

Next, the functional configuration of the information processing apparatus 100 according to this embodiment will be described with reference to FIG. 2. FIG. 2 is an explanatory diagram showing the functional configuration of the information processing apparatus 100 according to this embodiment. The information processing apparatus 100 is an example of a display control device for displaying a content on the display unit 102. The information processing apparatus 100 is a unit which controls a display method for a content to be displayed on the display unit 102, an operation of a graphical user interface and the like.

As shown in FIG. 2, the information processing apparatus 100 includes a communication unit 112, a content acquiring unit 114, a content arranging unit 116, a time difference calculating unit 118, a gravity center calculating unit 120, a display position setting unit 122, a brightness adjusting unit 124, a content display unit 126, an operation interface 128 and a display style changing unit 130.

(Communication Unit 112)

The communication unit 112 communicates with the database server 200 and other information processing apparatuses 300, 400 through the network 932. For example, the communication unit 112 acquires information about a shared content from the database server 200 or the other information processing apparatuses 300, 400. Although a case in which data about a content stored in the database 202 is acquired from the database server 200 is displayed as an example, the functional configuration of the communication unit 112 according to this embodiment is not limited to this example.

The database 202 connected to the database server 200 includes a content database 212 which stores shared contents and a comment database 214 which stores comments relating to the contents. The communication unit 112 acquires a content stored in the content database 212 from the database server 200 and a comment relating to the content from the comment database 214. The communication unit 112 inputs an acquired content into the content acquiring unit 114. The communication unit 112 inputs the acquired comment into a comment display unit 132.

(Content Acquiring Unit 114)

The content acquiring unit 114 acquires a content from the database server 200 through the communication unit 112. The content acquiring unit 114 acquires a content uploaded to the database server 200 by user of the other information processing apparatuses 300, 400. The contents can be grouped by the unit of user, for example. If the content is a picture, a plurality of pictures taken by each user is controlled in the form of an album in many cases. In that case, the content acquiring unit 114 acquires a plurality of pictures in the unit of an album. The contents may be grouped by an arbitrary unit. The content acquiring unit 114 inputs an acquired content into the content arranging unit 116, the gravity center calculating unit 120 and the content display unit 126.

(Content Arranging Unit 116)

The content arranging unit 116 rearranges contents acquired by the content acquiring unit 114 on the time base. For example, the content arranging unit 116 arranges a plurality of contents acquired by the content acquiring unit 114 in order of content acquisition date from the latest one or from the oldest one, based on the acquisition date of each content. Even if the contents acquired by the content acquiring unit 114 is grouped, the content arranging unit 116 arranges all the contents regardless of those groups on the time base.

If the content is a picture, its picture taking date is referred to as, for example, the time information. The picture data contains a storage area for metadata called exchangeable image file format (EXIF). Information of the picture taking date is recorded in this area. The content arranging unit 116 arranges pictures on the time base by referring to the information of the picture taking date given to each picture data. The information of the picture taking date may be stored in conjunction with picture data regardless of the EXIF area. In this case, the content arranging unit 116 arranges pictures with reference to the picture taking date stored separately.

In case where the content is a moving picture data, a picture taking date recorded as metadata in the same way as described above is referred to and the moving picture data is arranged based on the picture taking date. Alternatively, the moving picture data is arranged based on information about the picture taking date recorded separately. Other contents are also arranged based on the time information such as an acquisition date. The time information includes not only the above-described picture taking date and acquisition date but also a creation date or a change date of a content and arbitrary time information set by user. Although the time information is expressed as "date" above, it may be other time unit, for example, "day", "hour", "week", "month", "year", "second" and "minute" or a combination of these. The content arranging unit 116 inputs information of contents arranged on the time base into the time difference calculating unit 118.

(Time Difference Calculating Unit 118)

For contents arranged on the time base by the content arranging unit 116, the time difference calculating unit 118 calculates a difference of the time information existing between adjacent contents (hereinafter, the difference of the time information may be expressed as just time difference depending on a case). That is, the time difference calculating unit 118 calculates a difference in picture taking time, a difference in acquisition time and the like between contents adjacent to each other in terms of time. In case where the content is picture like the above case, the time difference calculating unit 118 calculates a difference in picture taking date between pictures adjacent to each other in terms of time. Even if the contents are grouped, the time difference calculating unit 118 calculates a time difference between the contents based on a sequence of the contents arranged by the content arranging unit 116. The time difference calculating unit 118 inputs information of the calculated time difference between the contents into the display position setting unit 122.

(Gravity Center Calculating Unit 120)

The gravity center calculating unit 120 calculates the gravity center of each content acquired by the content acquiring unit 114. For example, in case where the content is a picture, the gravity center calculating unit 120 calculates the gravity center of the picture using technologies for detection of a face of an object contained in the picture or analysis of its composition. The gravity center calculating unit 120 inputs information about the gravity center of calculated each content into the display position setting unit 122.

(Display Position Setting Unit 122)

The display position setting unit 122 sets a display position of each content based on the information of the time difference between the contents calculated by the time difference calculating unit 118 and the information of the gravity center of each content calculated by the gravity center calculating unit 120. The display position setting unit 122 sets or estimates a time axis in a predetermined direction within the screen and then sets a position on the time axis on which each content is to be displayed based on the time information of each content. Even if the contents are grouped, the display position setting unit 122 sets positions of all the contents based on a time axis. Although the display position setting unit 122 sets the position based on a time axis, it may set a display which can distinguish each content depending on a group which it belongs to.

The display position setting unit 122 sets the time axis in a direction to the deep side of the screen or in a direction on a horizontal plane parallel to the screen. If the time axis is set in the direction to the deep side of the screen, the display position setting unit 122 determines the size of a content and the position where a content is to be disposed based on skills on a perspective drawing method or the like so as to express a feeling of three-dimensional distance on the time axis. On the other hand, if the time axis is set in a direction on a horizontal plane parallel to the screen, the display position setting unit 122 sets an interval between contents to be displayed corresponding to a time difference between the contents.

As described above, the display position setting unit 122 determines an arrangement of the time axis based on the time information of the content and sets a distance on the time axis corresponding to a time difference between the contents. However, if the time difference between contents is very large, the display is extended meaninglessly, so that a feeling of unity of the contents on the time base can hardly be expressed easily. On the other hand, if a large number of contents are concentrated within a short period of time, the content of each content can hardly be recognized visually. Further, if the time difference is increased when the time axis is set in the direction to the deep side of the screen, the size of the content becomes too small, so that the content of the content can hardly be recognized visually. On the other hand, if the time difference is increased when the time axis is set in a direction on the horizontal plane parallel to the screen, the content can hardly be contained in a display area, so that even the relationship in terms of time between the contents can hardly be recognized visually.

Then, if the time difference between contents is equal to or greater than a predetermined value, the display position setting unit 122 sets an interval on the time axis with respect to the content short. That is, if the time difference is larger than the predetermined value, the display position setting unit 122 sets to an interval shorter than the interval on the time axis set based on the time difference. Likewise, if the time difference between the contents is equal to or below the predetermined value, the display position setting unit 122 may set the interval on the time axis with respect to the content large. That is, if the time difference is smaller than the predetermined value, the display position setting unit 122 may set an interval larger than the interval on the time axis set based on the time difference.

Further, the display position setting unit 122 can set a position on which to display a content within a display area in order to adapt to the shape of the display area where the content is to be displayed. For example, the display position setting unit 122 sets up the position where the content is to be displayed within the display area so that the gravity center of the display area where the content is to be displayed coincides with the gravity center of each content calculated by the gravity center calculating unit 120. By matching the gravity center of the display area with the gravity center of the content, even if the shape of the display area is largely different from the shape of the content, the content of the content becomes easy to recognize. The display position setting unit 122 inputs information about the position of each content on the time axis into the brightness adjusting unit 124 and the content display unit 126.

(Brightness Adjusting Unit 124)

The brightness adjusting unit 124 adjusts the brightness of a content to be displayed at each position corresponding to the position thereof on the time axis set by the display position setting unit 122. If the time axis is set in the direction to the deep side of the screen as described above, any content having a large time difference with respect to a content displayed on the forward side of the screen is displayed at a far position along the direction to the deep side. That is, as the distance between contents is increased, a content located on a deep side is displayed such that the size of the content is decreased.

To stress the feeling of a distance in the direction to the deep side, the brightness adjusting unit 124 adjusts the brightness of a content corresponding to the distance in the direction to the deep side so that brightness is lowered as it goes toward the deeper side. The brightness adjusting unit 124 inputs information about the brightness of each content into the content display unit 126.

(Content Display Unit 126)

The content display unit 126 displays a content acquired by the content acquiring unit 114 on the content display unit 102 based on position information on the time axis set by the display position setting unit 122 and information about the brightness after adjustment by the brightness adjusting unit 124.

The content display unit 126 sections the screen of the display unit 102 to display areas for each group and displays a content of each group in each display area. At this time, the content display unit 126 displays contents such that they are disposed in the direction to the deep side of the screen based on position information on the time axis set by the display position setting unit 122 in each display area. The content display unit 126 displays a content under a brightness corresponding to a distance in the direction to the deep side of the screen. A specific screen configuration of the content display unit 126 and its display control method will be described in detail later.

If contents having a different resolution are stored in the content database 212, the content display unit 126 selects and displays contents having a relatively low resolution as compared with a content displayed in a small size or a content displayed such that it is hidden behind other contents. For example, if a plurality of pictures taken under different resolutions of an identical object are registered in the content database 212, the content display unit 126 displays a picture taken under a relatively low resolution as a picture located far on the time axis (picture displayed in a small size) and a picture disposed behind other pictures. As a result, the amount of memory for use is reduced and picture drawing processing is accelerated.

(Operation Interface 128)

The operation interface 128 relays user's input operation by input devices 106, 108 such as a keyboard and a mouse. For example, an operation of graphical user interface displayed on the screen or user's operation such as a changing operation of display style is input to the display style changing unit 130 through the operation interface 128. Other user's operation is input to each constituent element of the information processing apparatus 100 through the operation interface 128.

(Display Style Changing Unit 130)

The display style changing unit 130 changes the configuration of the content display screen to be displayed on the display unit 102. The display style changing unit 130 changes the direction of the time axis on which contents are disposed, between a direction to the deep side of the screen and a direction on the horizontal plane parallel to the screen. The display style changing unit 130 executes changing processing for changing the configuration of the content display screen seamlessly. The functional configuration of the display style changing unit 130 concerning this changing processing will be described in detail later.

(Comment Display Unit 132)

The comment display unit 132 displays a comment acquired from the database server 200 through the communication unit 112 on the display unit 102. The comment display unit 132 can display a comment input interface for inputting a comment on the display unit 102. The comment display unit 132 displays a display area on which a comment is to be displayed and an object indicating the relationship between the content and comment on the display unit 102.

The functional configuration of the information processing apparatus 100 according to this embodiment has been described above. As described above, the information processing apparatus 100 according to this embodiment has a function for displaying a plurality of contents on the time base, based on the time information of the content. The information processing apparatus 100 has a function of adjusting a display interval by providing a predetermined threshold for the time difference when the display interval between contents to be displayed on the time base is set corresponding to the time difference. Further, the information processing apparatus 100 has a function of calculating the time difference for all the contents even if the contents are grouped and of setting a display position with the time axis used as a standard based on the time difference. Hereinafter, a case where the content is a picture will be exemplified and described in detail.

[Setting Method for Display Position]

Figure 3:
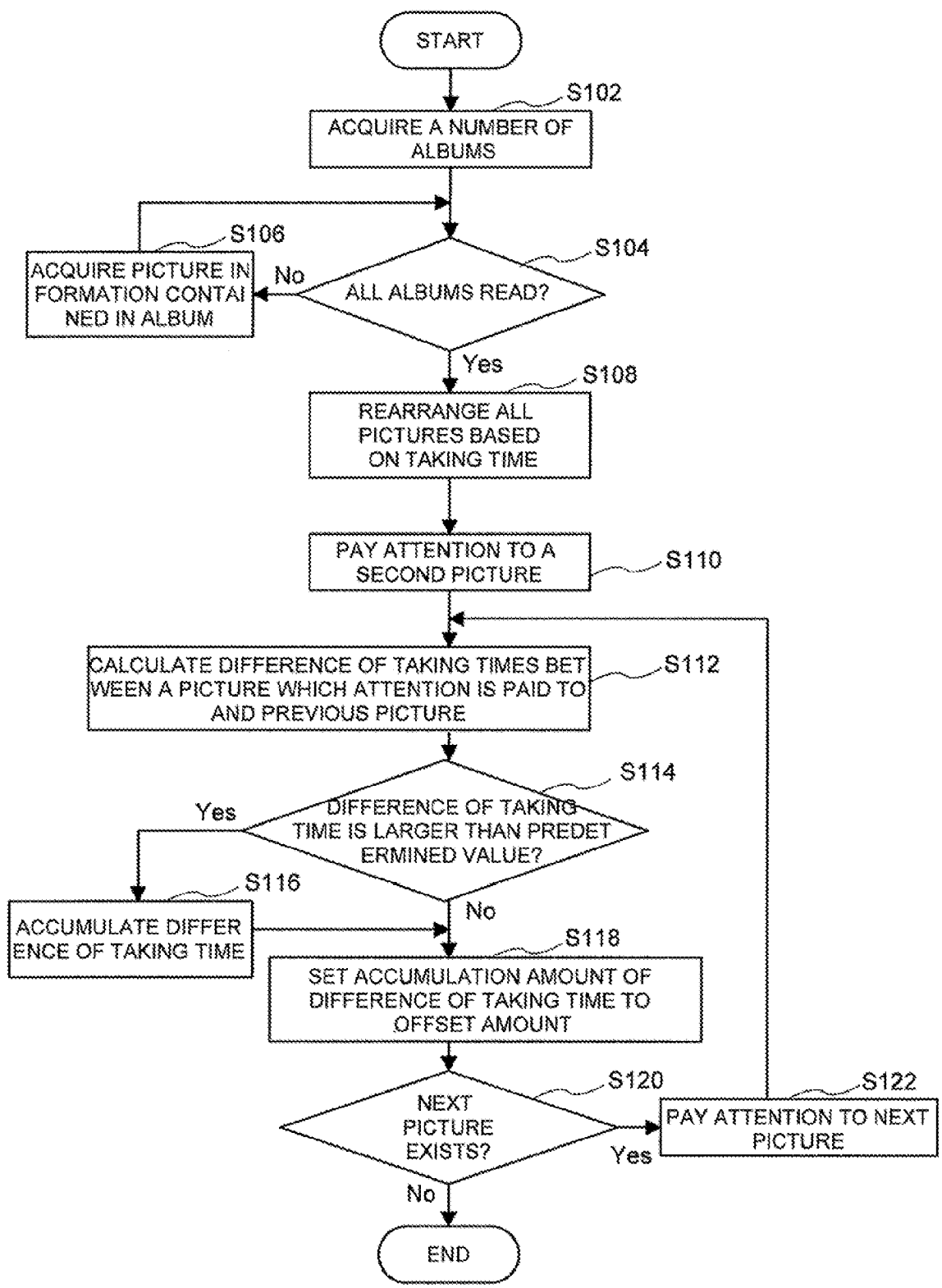
FIG. 3 is an explanatory diagram showing a flow of display method according to the embodiment.

Next, the setting method for the display position according to this embodiment will be described with reference to FIG. 3. FIG. 3 is an explanatory diagram showing a flow of the setting processing of the display position according to this embodiment. Although FIG. 3 exemplifies a case of a picture, even if other types of contents are adopted, the setting processing for the display position according to this embodiment can be achieved by substantially the same processing.

As shown in FIG. 3, first, a number of albums is acquired by the content acquiring unit 114 (S102). Next, whether or not pictures of all the album have been read is determined (S104). Unless all the album is read, the information processing apparatus 100 proceeds to a processing of step S106. On the other hand, if all the album is read, the information processing apparatus 100 proceeds to a processing of step S108. In step S106, the content acquiring unit 114 reads pictures of an album not yet read (S106) and proceeds to a processing of step S104.

In step S108, the content arranging unit 116 arranges all pictures based on the taking time of each picture in time series (S108). Next, the time difference calculating unit 118 displays/processes a picture located at a second position from the head (S110). Next, the time difference calculating unit 118 calculates a difference of taking times between the picture which is being displayed/processed and a picture located in front of the picture (S112). Next, the display position setting unit 122 determines whether or not the difference of the taking time calculated by the time difference calculating unit 118 is larger than a predetermined value (S114). If the difference of the taking time is larger than the predetermined value, the information processing apparatus 100 proceeds to a processing of step S116. On the other hand, if the difference of the taking time is smaller than the predetermined value, the information processing apparatus 100 proceeds to a processing of step S118.

In step S116, the differences of the taking times are accumulated (summed) by the display position setting unit 122 and held as an accumulation amount (S116) and the procedure proceeds to a processing of step S118. In step S118, the accumulation amount which is a difference of the taking time is stored by the display position setting unit 122 as an offset amount of the picture (S118). Next, the information processing apparatus 100 determines whether or not a next picture exists (S120). If a next picture exists, the information processing apparatus 100 proceeds to a processing of step S122. On the other hand, unless the next picture exists, the information processing apparatus 100 terminates the setting processing of the display position.

The "next picture" means a picture located behind the picture which is being displayed/processed in terms of time series. In step S122, the time difference calculating unit 118 pays attention to the next picture (S122) and proceeds to a processing of step S112. Processing between step S112 and step S120 is repeated until all the pictures are disposed on the time axis.

The above description is supplemented. As described above, the position of each picture on the time axis is set corresponding to the difference of the taking time. However, if the difference of the taking time is larger than a predetermined value, the picture is set up at a position on the time axis corresponding to "difference of taking time=predetermined value (or difference of taking time<predetermined value)". When such a correction processing is applied, a connection between a distance between the contents displayed on the time axis and an actual difference of the taking time is lost. Thus, adjustment of the display screen corresponding to this correction processing is necessary. Then, an offset value concerning the difference of the taking time of a picture which is subjected to the correction processing is held to be usable for adjustment of the display screen.

The setting method for the display position according to this embodiment has been described above. If the setting method for the display position according to this embodiment is applied, a picture whose difference of the taking time is larger than a predetermined value is adjusted so that an interval on the time axis with respect to a picture located in front of the picture is shorter. By changing the processing of step S114, the interval on the time axis with respect to a picture whose difference of the taking time is smaller than the predetermined value can be adjusted to be longer.

[Specific Display Screen Configuration 1]

Figure 4:
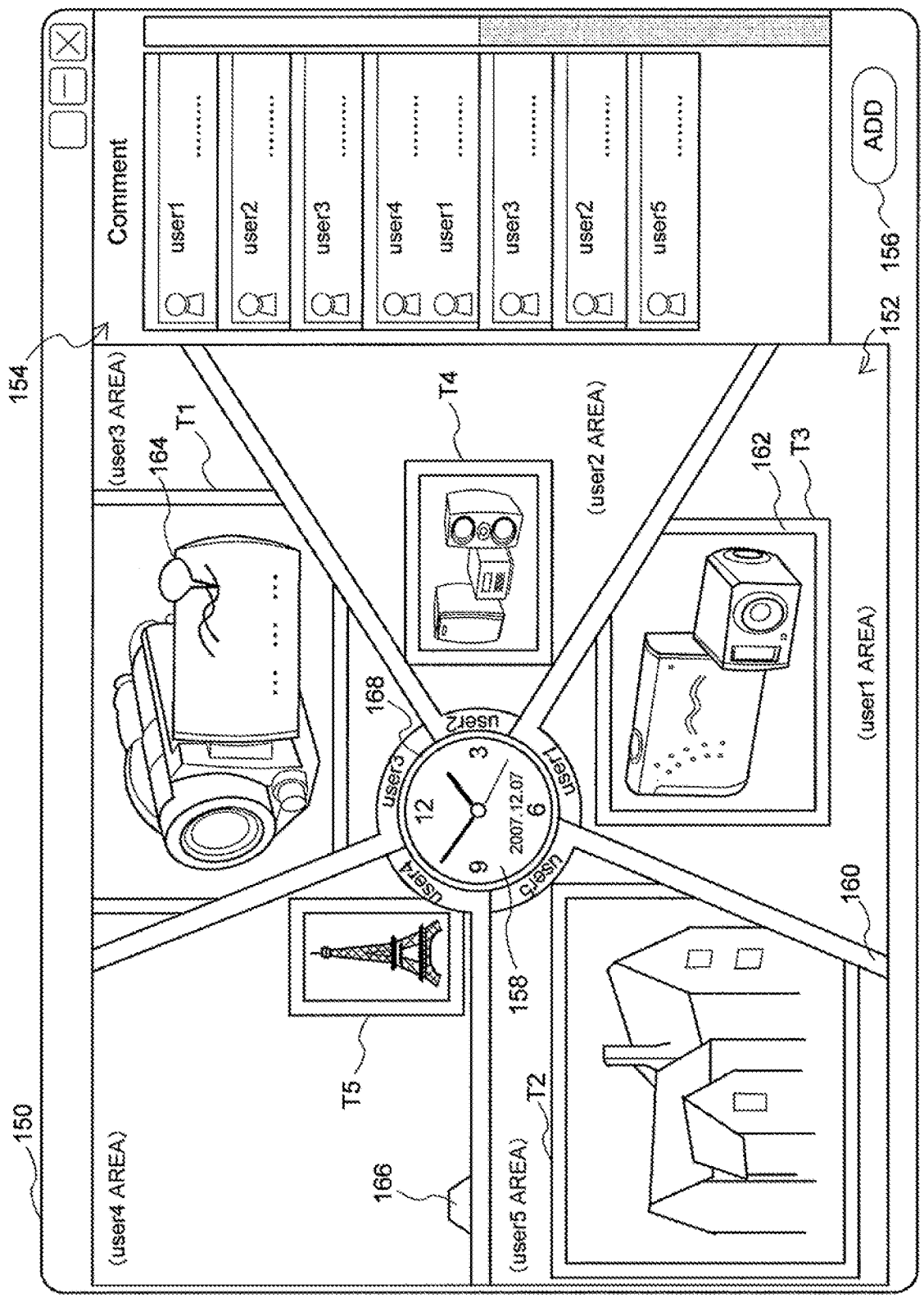
FIG. 4 is an explanatory diagram showing an example of a display screen according to the embodiment.

An example of a specific display screen which is achieved with the information processing apparatus 100 according to this embodiment will be described with reference to FIG. 4. FIG. 4 is an explanatory diagram showing an example of a specific display screen configuration according to this embodiment. In a description below, this display style is called pizza view depending on a case. In this display style, the time axis is set in the direction to the deep side of the screen. That is, a feeling of distance is expressed with the size of a content to be displayed, a display position and the like based on a solid display method like a perspective drawing method, so that a distance in the direction to the deep side along the time axis is specified.

FIG. 4 shows an example of the graphical user interface displayed on the display screen 150 of the display unit 102. As shown in FIG. 4, the display screen 150 is configured of mainly a content display area 152, a comment display area 154, and a comment addition button 156.

(Content Display Area 152)

The content display area 152 is formed of a plurality of display areas sectioned by a plurality of border areas 160 extending radially with a unit near the center thereof serving as a reference point. These display areas are allocated to each group.

In the example of FIG. 4, it is assumed that pictures are grouped for each user and areas for respective users (user1 AREA, user2 AREA, user3 AREA, user4 AREA, user5 AREA) are displayed. Pictures (T1, T2, T3, T4, T5) are displayed in each user area. The pictures $T_i$ (i=1 to 5) are given a symbol $T_i$ having a small index i in the order of the taking time from the latest one. Thus, a picture T1 is displayed on a forward side on the time axis with respect to a picture T5.

A content frame 162 is provided around each picture. This content frame 162 is expressed in an inherent color of a group which the picture belongs to. If the group of user1 is orange, the content frame 162 of pictures which belong to the group is expressed in orange. A comment object 164 is attached to a picture (T1) supplied with a comment. This comment object 164 may be a dialogue balloon like object as shown in FIG. 4.

The border area 160 includes indications of user1, user2 and the like to clarify to which user each area is allocated. A reference time display area 158 is displayed in the vicinity of the center of the content display area 152 surrounded by these border areas 160. A reference time located on a most forward position of the time axis is displayed in this reference time display area 158. The border area 160 has a display changing tab 166 for changing over the display style. When this display changing tab 166 is clicked, the display is changed to other display style described later.

(Comment Display Area 154, Comment Addition Button 156)

The comment display area 154 displays comments written by each user. In the example of FIG. 4, comments of a plurality of users (user1, user2, user3, user4, user5) are displayed. These comments may be comments given to a picture displayed in the content display area 152 or may be comments written for free communication with other users. If the comment is given to a picture, the comment object 164 is displayed in the picture displayed in the content display area 152.

These comments are shared by other users through the network 932. That is, a comment written into the comment display area 154 is transmitted to the database server 200 through the network 932 and accumulated in the comment database 214 of the database 202. Thus, each user can view a comment by other user from the comment database 214 using the information processing apparatuses 300, 400 as a shared comment. The frame of an area in which a comment is displayed is expressed in the same color as the content frame 162 of a picture supplied with the comment. When the area in which the comment is displayed is clicked, the reference time is changed to a picture taking time of the picture supplied with the comment.

The comment addition button 156 is a button for adding a comment to the comment display area 154. For example, when the comment addition button 156 is pressed, a text input screen in which a comment is to be input is displayed. User can add a comment to the comment display area 154 by writing a desired comment into the text input screen thereof. Further, user can attach a comment to a picture by specifying the picture displayed in the content display area 152 and adding the comment.

(Display Control Method by User Operation)

A display control method by user operation will be described by referring to FIG. 4 with the aforementioned display configuration in mind.

The pizza view allows pictures displayed in the content display area 152 to be selected and the reference time displayed in the reference time display area 158 to be changed. For these operations, the input devices 106, 108 such as a keyboard, mouse, are used.

When the mouse pointer points a picture displayed in the content display area 152, the color and brightness of the content frame 162 of the picture are changed so as to express that the picture has been pointed in a visual manner. If the picture is clicked with the mouse in the pointed condition, the clicked picture is selected and the selected picture is displayed on the forward surface. The reference time is updated by the picture taking time of the picture displayed on the forward surface and then, the reference time displayed in the reference time display area 158 and the position of the picture displayed in the content display area 152 are changed.

When up/down keys of the keyboard are operated also, the reference time displayed in the reference time display area 158 is updated. Further, when a jog dial 168 formed around the reference time display area 158 is operated with a mouse pointer also, the reference time displayed in the reference time display area 158 is updated. Of course, the position of the picture displayed in the content display area 152 is also updated corresponding to a change of the reference time by these operations.

If the jog dial 168 is rotated in the rightward direction with respect to 12 o'clock of a clock, the reference time is advanced and if the jog dial is rotated in the leftward direction with respect to the 12 o'clock, the reference time is retreated. While the jog dial 168 is being rotated, the advancement or retreat of the reference time continues. That is, automatic feeding function for the reference time is possessed. This function is allocated to, for example, the right click of the mouse and a start and stop of the feeding are controlled by toggle operation. The jog dial may be set to return to a startup time when the jog dial is moved to a time corresponding to a final picture disposed on the time axis. As the jog dial 168 is rotated more largely, the degree of the advancement of the reference time per unit time is increased.

An example of a specific display screen configuration according to this embodiment will be described above. The display screen according to this embodiment includes individual display areas of a plurality of groups as described above, so that contents belonging to the respective groups are displayed at the same time. Because the contents displayed on all the display areas are disposed on a common time axis, the displays of the contents displayed on all the display areas are related with one another based on the time information.

If a reference time is specified, for example, a position on the time axis which agrees with the reference time is displayed on the most forward surface of the screen and contents which express a feeling of distance in the direction to the deep side are displayed corresponding to a distance on the time axis with the position on the most forward surface thereof as a reference. As a result, user can recognize the feeling of a unity on the time base with respect to all the contents easily while grasping the group attribute of each content.

Such a display screen configuration is very effective in a case where a plurality of users share contents acquired in a common action process. For example, if the plurality of users share pictures taken when they participate in a common event, each user may desire to view pictures of other users at the same time. If the plurality of users behave together, each user may desire to view pictures taken by other user at some point simultaneously. According to a content viewing method known in related art, it is difficult to display all pictures by traversing all albums and grasp the unity of the pictures on the time base while recognizing a difference in album. As described above, this embodiment has eliminated such a difficulty efficiently.

[Specific Display Screen Configuration 2]

Figure 5:
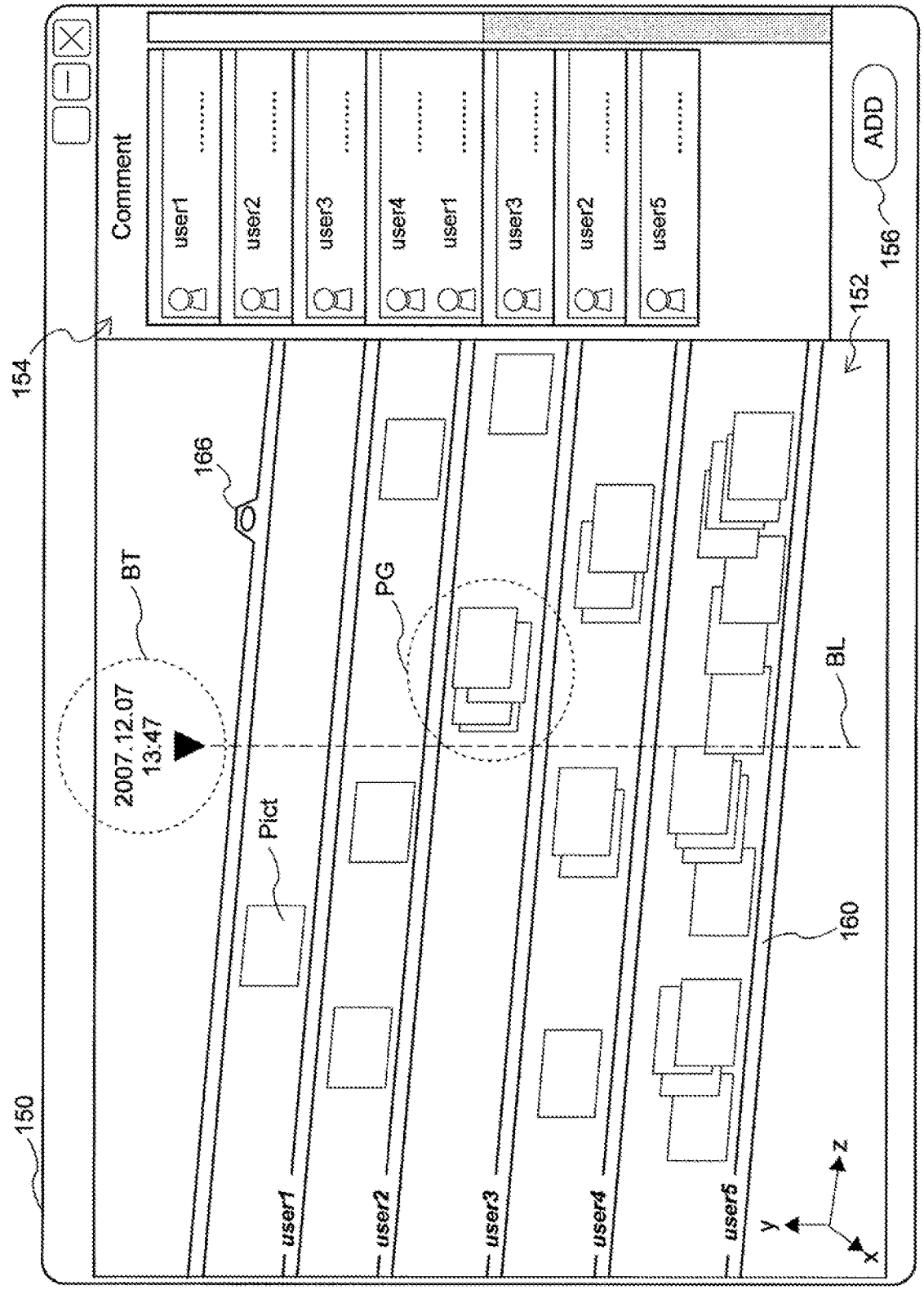
FIG. 5 is an explanatory diagram showing an example of a display screen according to the embodiment.

Next, other specific display screen configuration according to this embodiment will be described with reference to FIG. 5. FIG. 5 is an explanatory diagram showing an example of the other specific display screen configuration according to this embodiment. In a description below, the display screen configuration (display style) of FIG. 5 is called timeline view depending on a case. The display screen configuration shown in FIG. 5 is transited from the display screen configuration shown in FIG. 4 seamlessly as described above.

As shown in FIG. 5, the display screen 150 in the timeline view is configured of mainly the content display area 152, the comment display area 154 and the comment addition button 156. This is different from the pizza view in terms of the display style of the content display area 152. Mainly differences according to the content display area 152 will be described.

(Content Display Area 152)

In this display style, the rightward direction of the display screen 150 is expressed as z-axis, the upward direction is expressed as y-axis and the depth direction is expressed as −x-axis. The time axis is set in the z-axis direction and a picture is displayed along the z-axis direction. Although the direction of the z-axis is in the rightward direction, it is set in a slightly inclined direction. The direction of disposing pictures can be set in an arbitrary direction within the display screen 150.

Pictures are classified for each group like the pizza view. In the timeline view, to express a section of each group, display areas are arranged in parallel in the y-axis direction of the content display area 152. Because in the example of FIG. 5, the pictures are grouped for each user, a display area for displaying pictures is formed for each user. Thus, as shown in FIG. 5, the border areas 160 for sectioning the display area for each user are arranged in parallel in the y-axis direction in the content display area 152. The border area 160 displayed on the topmost line is provided with a display changing tab 166 for changing the display style.

Using this display style, user can grasp a unity of pictures with a relatively wide time interval as compared with the pizza view. Because the plurality of pictures taken within a relatively short time interval are displayed collectively, user can easily grasp a unity of pictures such as content group PG shown in FIG. 5. If a plurality of pictures are concentrated on the time axis within a shorter time interval than a predetermined value, part or all of the concentrated pictures may be dispersed in the z-axis direction. The overview property is further improved by disposing pictures dispersedly in this way.

In the timeline view shown in FIG. 5, the reference time BT is displayed on the top of the content display area 152. In FIG. 5, a reference line BL is marked to indicate the position of the reference time on the time axis extending in the z-axis direction. In the meantime, the reference time BT, the frame indicating the content group PG and the reference line BL do not need to be displayed on an actual display screen. In the timeline view, the position of the reference line BL and the time axis interlock with each other and if the reference time BT is changed, the display position of the picture is updated so that a position on the time axis corresponding to the reference time BT agrees with the reference line BL. That is, if the reference time BT is changed, the positions of pictures are changed so that they flow in the z-axis direction.

(Display Control Method by User Operation)

The display control method by user operation will be described briefly with reference to FIG. 5 with the aforementioned display configuration in mind.

In the timeline view, the selection operation for pictures displayed in the content display area 152 and the changing operation for the reference time BT can be carried out. The input devices 106, 108 such as the keyboard and mouse are used for such operations. For example, if a picture is pointed with the mouse, a frame is displayed around the pointed picture and then, the picture comes up to the forward surface. The color of the frame displayed around the pointed picture may be an inherent color to a group which the picture belongs to. Further, when the pointed picture is clicked with the mouse, the clicked picture is selected and at the same time, the reference time BT is updated to a picture taking time of the selected picture. Then, display positions of all the pictures are changed based on the updated reference time BT. In the meantime, the reference time BT may be changed corresponding to an operation of the right and left keys of the keyboard.

An example of the specific display screen configuration according to this embodiment has been described above. Like the case of the pizza view described with reference to FIG. 4, the display screen according to this embodiment includes, for example, individual display areas for a plurality of groups so that contents belonging to the respective groups are displayed at the same time. The contents displayed in all the display areas are arranged on a common time axis and displayed with respect to the reference time. Thus, representations of contents displayed on all the display areas are related with one another based on the time information.

That is, if a standard time is specified, for example, a position on the time axis which agrees with the standard time is displayed in the center of the screen and contents are displayed in the x-axis direction corresponding to a distance on the time axis based on the position. As a result, user can recognize a feeling of unity on the time base relating to all the contents easily while grasping the group attribute of each content for the grouped contents.

[Display Style Changing Method]

As described above, the information processing apparatus 100 according to this embodiment can achieve two display styles inherent to this embodiment, that is, the previously described pizza view and timeline view. Although each display style can ensure an extraordinary effect independently, the information processing apparatus 100 according to this embodiment has a unit (display style changing unit 130) which changes these display styles seamlessly. Thus, the both display styles can be changed over corresponding to an application. Hereinafter, the functional configuration of the display style changing unit 130 will be described more in detail.

(Functional Configuration of Display Style Changing Unit 130)

Figure 6:
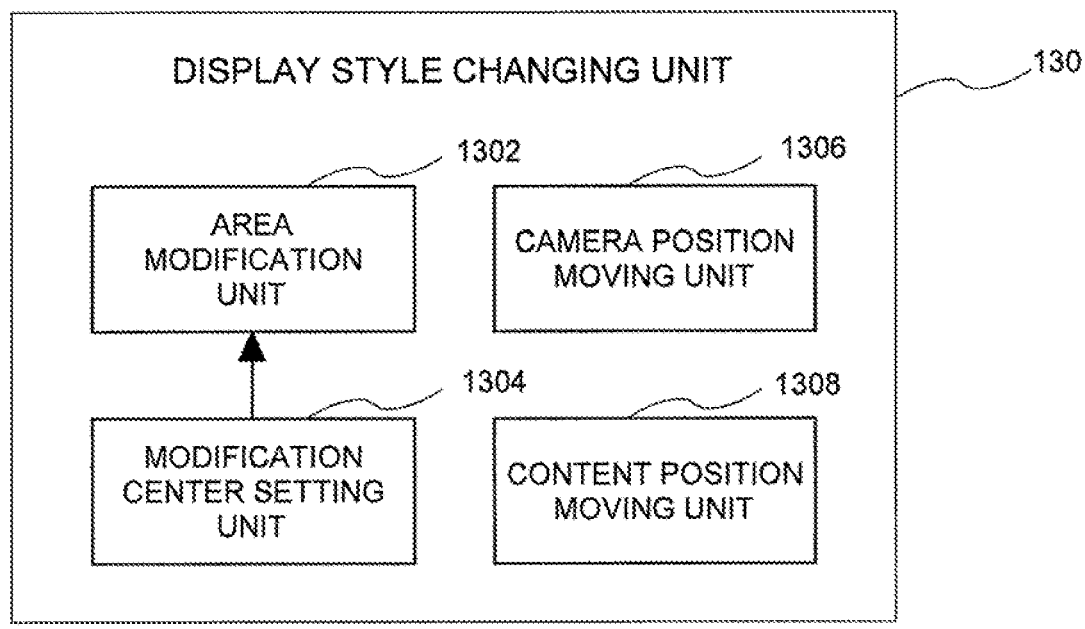
FIG. 6 is an explanatory diagram showing a functional configuration of a display style changing unit according to the embodiment.

The detailed functional configuration of the display style changing unit 130 will be described with reference to FIG. 6. FIG. 6 is an explanatory diagram showing the detailed functional configuration of the display style changing unit 130.

As shown in FIG. 6, the display style changing unit 130 mainly includes an area modification unit 1302, a modification center setting unit 1304, a camera position moving unit 1306 and a content position moving unit 1308.

(Area Modification Unit 1302)

The area modification unit 1302 modifies the display area (hereinafter, display section) of each group sectioned by the border area 160. The area modification unit 1302 modifies the shape of each display section of the pizza view shown in FIG. 4 and the timeline view shown in FIG. 5. In the modification processing of the display style, the area modification unit 1302 allows user to modify the display section seamlessly without losing the correlation of the display sections. This modification method will be described more in detail below.

(Modification Center Setting Unit 1304)

When the display section is modified by the area modification unit 1302, the modification center setting unit 1304 sets a modification center which serves as a standard for the modification processing. The modification center setting unit 1304 sets the modification center at a center of the content display area 152, a center of each quadrant or a predetermined position of the content display area 152 by estimating a predetermined visual effect. At this time, the modification center setting unit 1304 may classify a plurality of points or vectors for specifying the shape of a display section and set a plurality of modification centers.

(About Modification Method for Display Section)

The modification method for the display section according to this embodiment will be described with reference to FIGS. 7, 8, 9, and 10.

Figure 7:
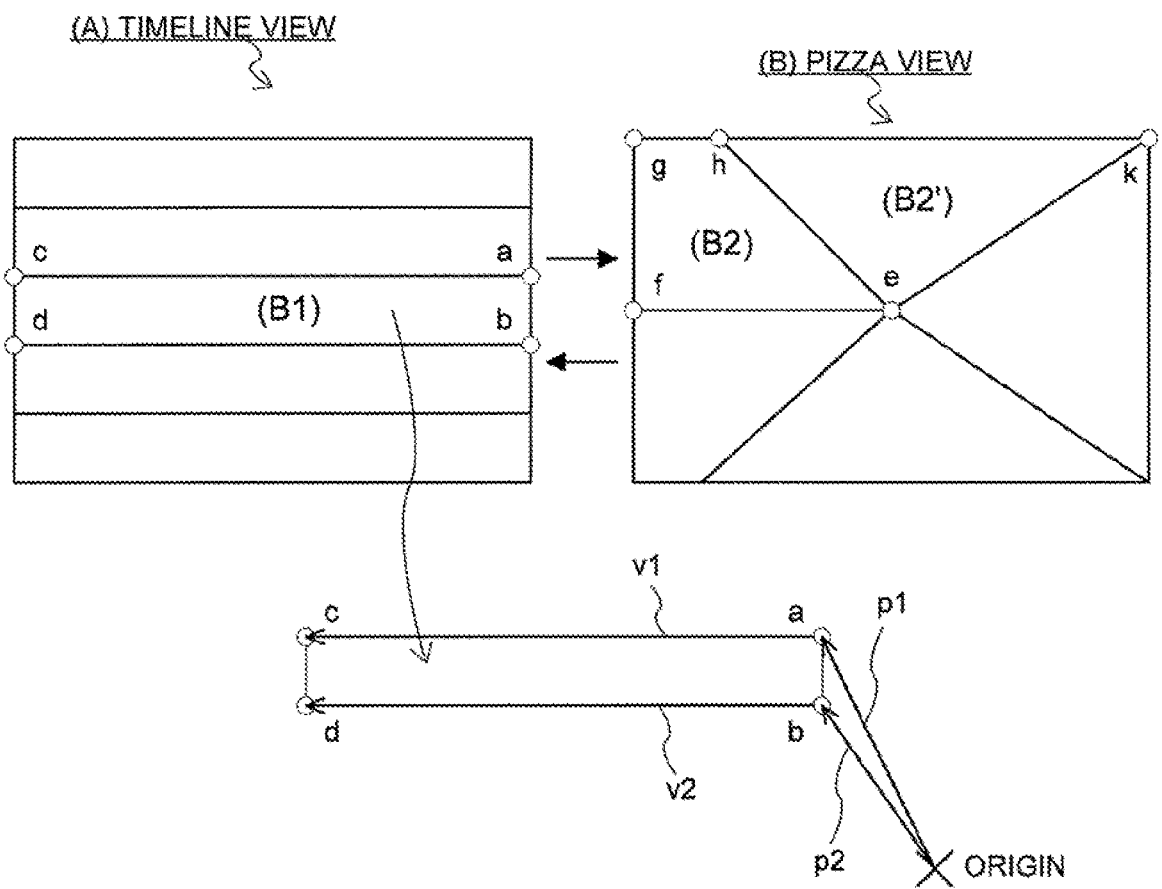
FIG. 7 is an explanatory diagram showing a modification method of a display area according to the embodiment.

First, FIG. 7 is referred. FIG. 7 schematically shows a plurality of display sections (A) in the timeline view and a plurality of display sections (B) in a corresponding pizza view. Here, with attention paid to a display section (B1) specified by points (a, b, c, d) in the timeline view, a method for modifying this to a display section (B2, B2') specified by points (e, f, g, h) or points (e, h, k) in the pizza view will be described as an example. Of course, the modification method for the display section according to this embodiment is not limited to this example.

To specify a rectangular display section (B1), the area modification unit 1302 holds information about position vectors p1, p2 of points a, b and vectors v1, v2 in which the points a, b serve as an origin and the points c, d serve as an end. Then, the area modification unit 1302 changes the position vectors p1, p2 and the vectors v1, v2 according to a predetermined rule so as to modify the display section in agreement with desired display sections (B2, B2').

A method for modifying the display section (B1) specified by the points (a, b, c, d) in the timeline view to the display section (B2') specified by the points (e, h, k) in the pizza view will be described with reference to FIG. 8.

First, the area modification unit 1302 changes the position vectors p1, p2 smoothly so that the position vectors p1, p2 agree with a position vector in which the point e serves as an end. Further, the area modification unit 1302 changes the vector v1 smoothly so that the vector v1 agrees with a vector in which the point e serves as an origin while the point k serves as an end. Further, the area modification unit 1302 changes the vector v2 smoothly so that the vector v2 agrees with a vector in which the point e serves as an origin while the point h serves as an end. The processing for changing the position vectors p1, p2 and the processing for changing the vectors v1, v2 are executed smoothly and continuously as shown in steps S202, S204.

Next, a method for modifying the display section (B1) specified by the points (a, b, c, d) in the timeline view to the display section (B2) specified by the points (e, f, g, h) in the pizza view will be described with reference to FIG. 9.

First, the area modification unit 1302 changes the position vectors p1, p2 smoothly so that the position vectors p1, p2 agree with a position vector in which the point e serves an end. Further, the area modification unit 1302 changes the vector v1 smoothly so that the vector v1 agrees with a vector in which the point e serves as an origin while the point h serves as an end. At this time, the area modification unit 1302 specifies a vector v3 having the same origin as the vector v1 and changes the vector v3 smoothly so that the vector v3 agrees with a vector in which the point e serves as an origin while the point g serves as an end.

Further, the area modification unit 1302 changes the vector v2 smoothly so that the vector v2 agrees with a vector in which the point e serves an origin while the point f serves as an end. The processing for changing the position vectors p1, p2 and the processing for changing the vectors v1, v2, v3 are executed smoothly and continuously as shown in steps S212, S214.

Figure 8:
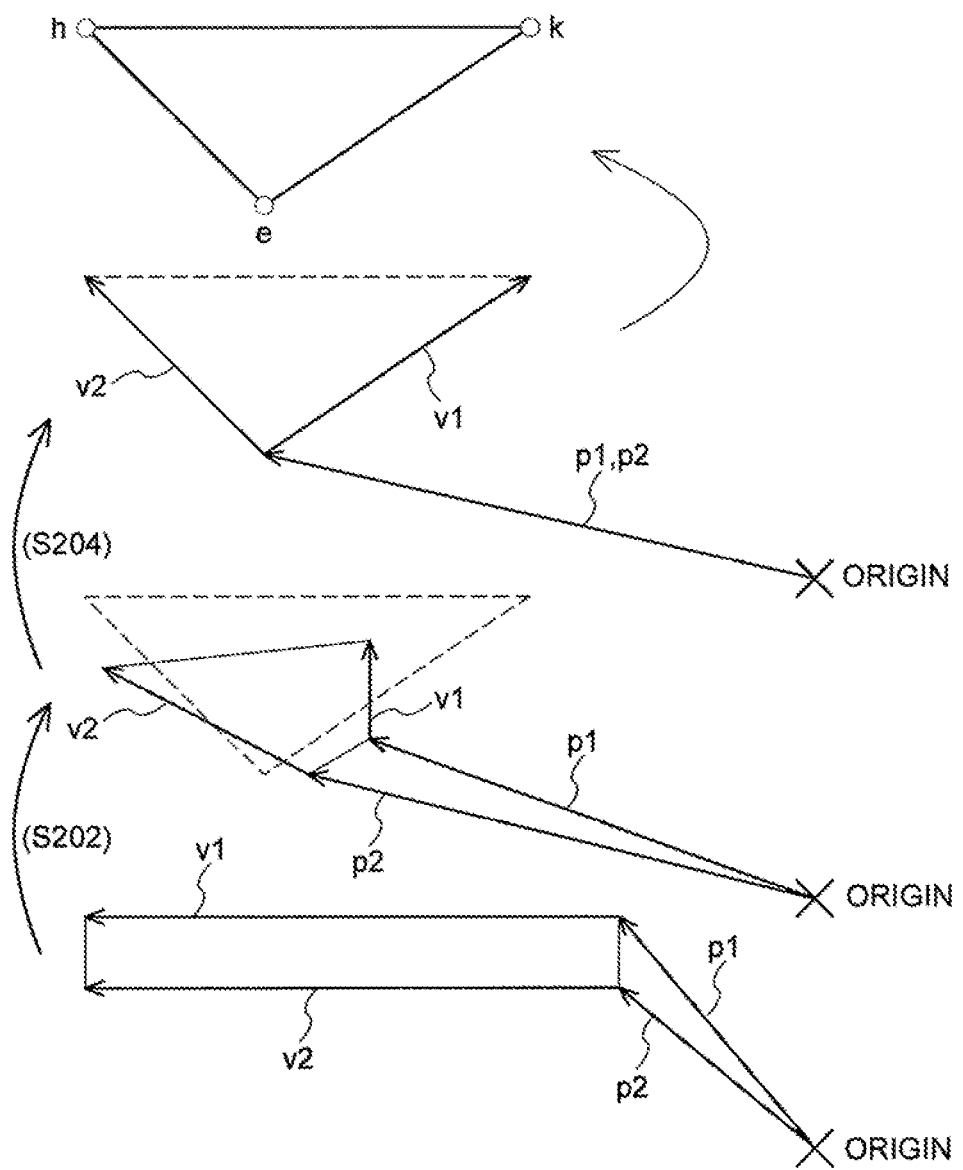
FIG. 8 is an explanatory diagram showing a modification method of a display area according to the embodiment.
Figure 9:
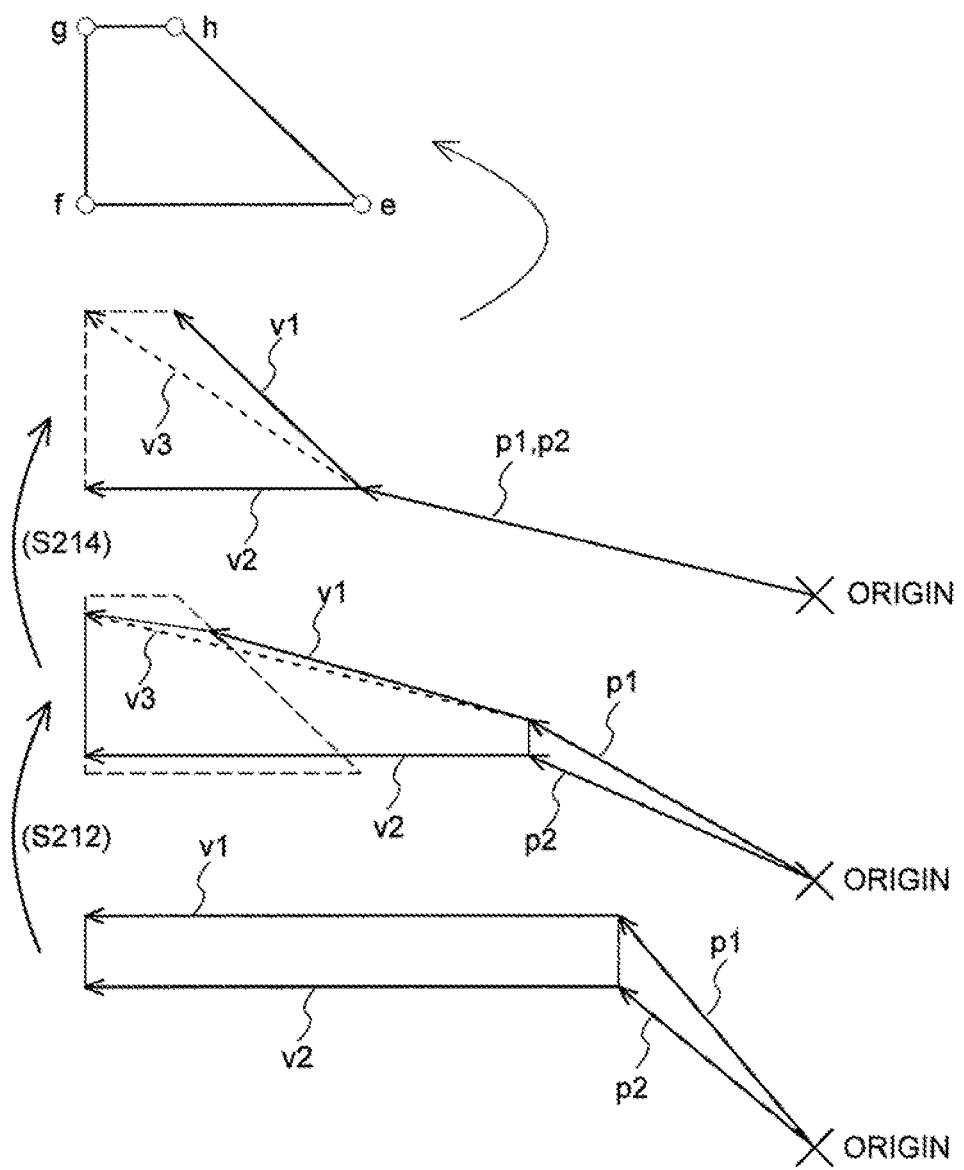
FIG. 9 is an explanatory diagram showing a modification method of a display area according to the embodiment.

As shown in FIGS. 8 and 9, each vector is changed smoothly so that the display section is modified smoothly. When the display style is changed from the pizza view to the timeline view, the above-described processing is carried out in a revere order so as to achieve a smooth modification of the display section. At this time, the vector v3 shown in FIG. 9 is modified so as to agree with the vector v1. Although the area modification unit 1302 may change each vector linearly, the area modification unit may change each vector non-linearly according to a predetermined rule. As the non-linear changing method, for example, a following method is available.

Figure 10:
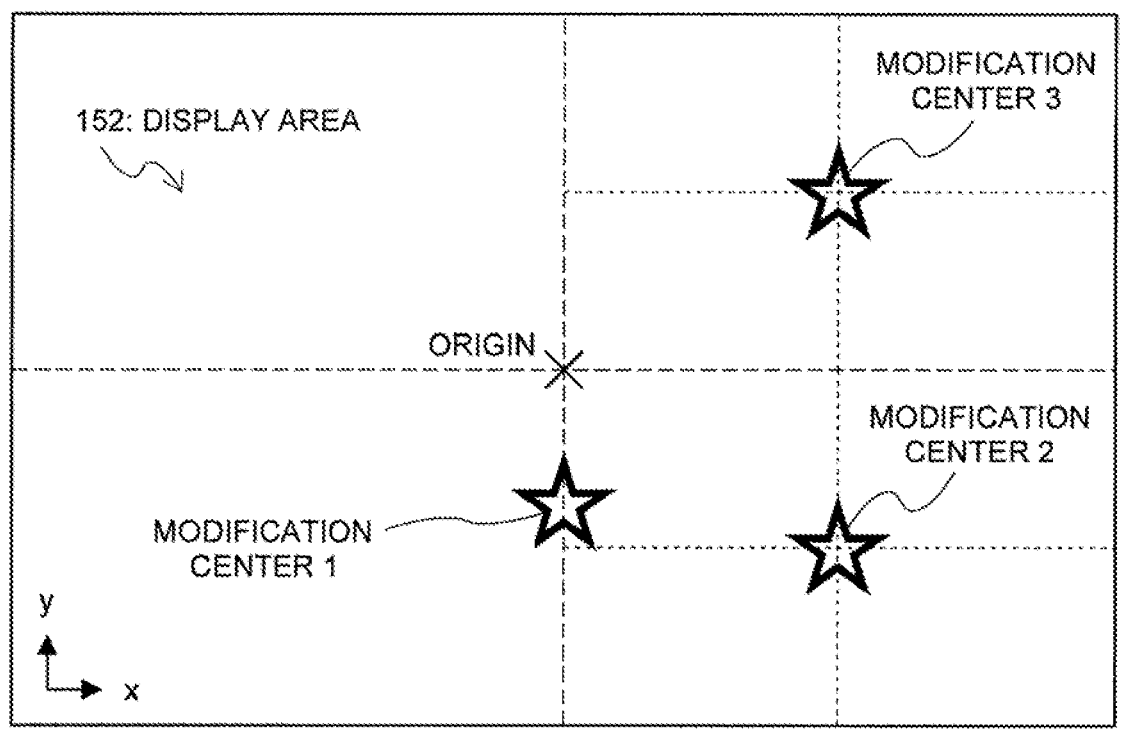
FIG. 10 is an explanatory diagram showing a modification method of a display area according to the embodiment.

FIG. 10 is referred. FIG. 10 schematically depicts schematically the content display area 152 which is divided to quadrants around an origin. In the content display area 152, a plurality of modification centers (modification center 1, modification center 2, modification center 3) are set by the modification center setting unit 1304. The modification center 1 is disposed near the center of the content display area 152. The modification center 2 and the modification center 3 are disposed, for example, near the center of each quadrant. The area modification unit 1302 can change the vectors using these modification centers non-linearly.

For example, to change the position vectors p1, p2, the area modification unit 1302 changes the position vectors p1, p2 so that the change of a distance between the modification center 1 and the position vectors p1, p2 is minimized. On the other hand, when the vectors v1, v2 (v3) are changed, the area modification unit 1302 determines in which quadrant the positions of the ends of the vectors v1, v2 (v3) are located of the content display area 152.

For example, if the end positions of the vectors v1, v2 (v3) are located in a first quadrant (right top), the area modification unit 1302 changes the vectors v1, v2 (v3) so that the change of the distance between the modification center 3 and the end positions of the vectors v1, v2 (v3) is minimized. Likewise, if the end positions of the vectors v1, v2 (v3) are located in a fourth quadrant (right bottom), the area modification unit 1302 changes the vectors v1, v2 (v3) so that the change of the distance between the modification center 2 and the end positions of the vectors v1, v2 (v3) is minimized.

Figure 13:
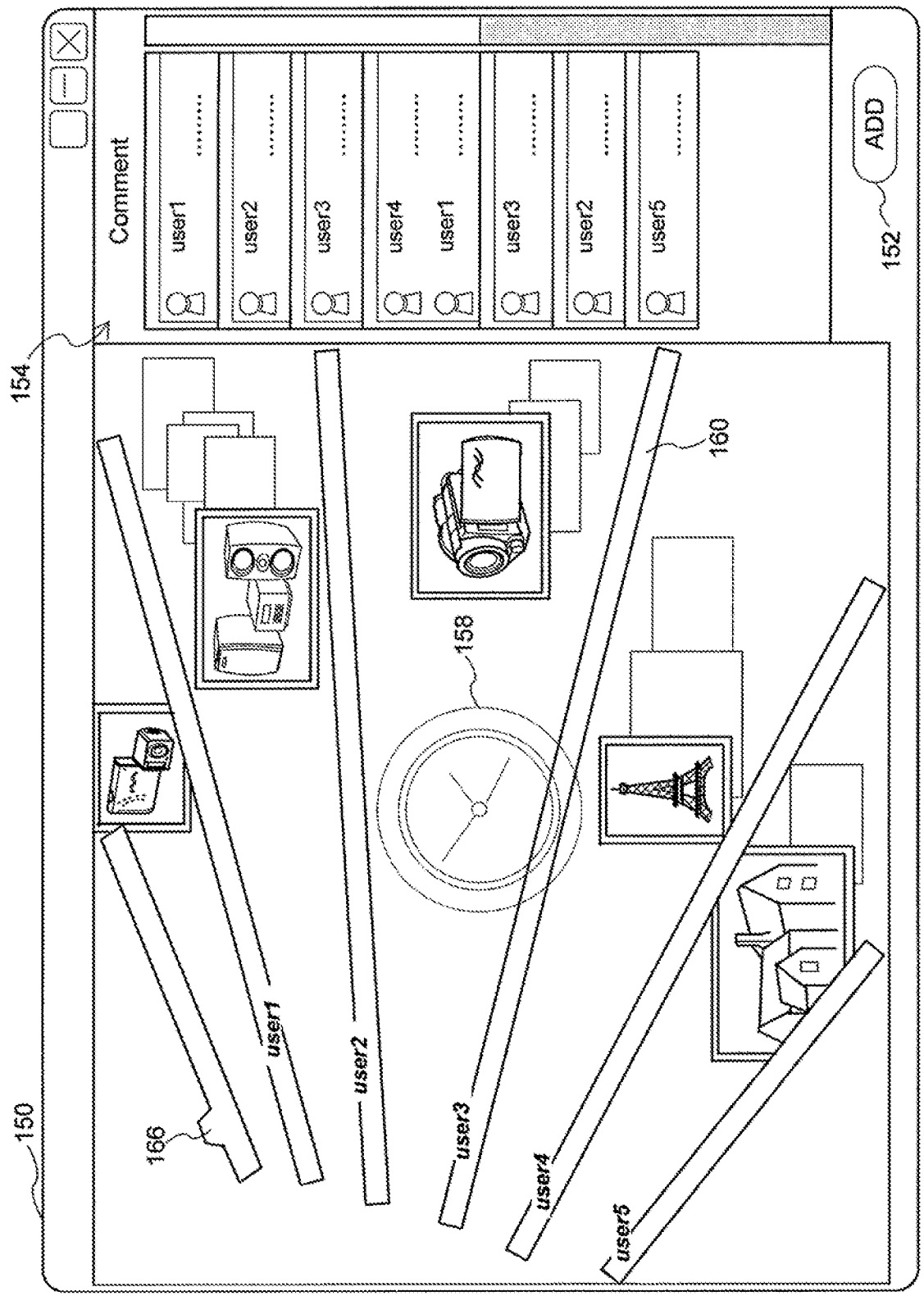
FIG. 13 is an explanatory diagram showing an example of a display screen according to the embodiment.

The area modification unit 1302 may select the modification center based on a quadrant in which the end of each vector is located as described above or may select the modification center simply based on the top side/bottom side or the right side/left side of the content display area 152 or the like. If each vector is modified based on the above-described method, a modification motion similar to an opening/closing motion of a fan is realized in the entire display sections as shown in FIG. 13. As described above, each display section is modified by the area modification unit 1302 and the modification center setting unit 1304.

(Camera Position Moving Unit 1306)

FIG. 6 is referred again. The camera position moving unit 1306 is a unit which moves the direction and position of the viewpoint (hereinafter referred to as camera) which serves as a determination standard for the display position when the display position of the content is changed. Particularly, the camera position moving unit 1306 moves the direction and position of the camera in each display section.

It can be considered that the contents displayed in the content display area 152 are disposed in a virtual solid space formed in each display section. Then, it can be considered that a side face of a content disposed in the virtual solid space observed from a camera directed in a predetermined direction is displayed in each display section. To display a content sterically on a two-dimensional screen, for example, a stereoscopic display method such as perspective drawing method is used. Such a display method itself can be realized using the arithmetic operation function of the information processing apparatus 100.

If based on the above-described concept, changing the viewpoint by moving the camera position means changing of how a content displayed on the screen is expressed. For example, a moving processing of the camera position by the camera position moving unit 1306 is changing how the content displayed in each display section is expressed, corresponding to a moving direction and a moving position. Conversely, if the position or facing direction of any content is changed, it means that the camera position is moved. That is, by changing the position or facing direction of the content, substantially the same processing as by changing a user's viewpoint is achieved. More specifically, the camera position moving unit 1306 executes a processing of reflecting an image observed from the moved camera to a content displayed in the display section.

(Content Position Moving Unit 1308)

The content position moving unit 1308 moves the display position of the content. The content position moving unit 1308 adjusts the positional relation of contents after the displayed image of the content is changed by the camera position moving unit 1306. If a plurality of contents are displayed by being shifted so as to avoid a completely overlapping display according to a certain display style, the content position moving unit 1308 restores the shift to its original state or displays the contents by shifting the contents so as to avoid an overlapping display based on other display style. The content position moving unit 1308 changes the direction of any content so as to face directly a camera position moved by the camera position moving unit 1306.

(About Content Moving Method)

Hereinafter, the moving method for the contents by the camera position moving unit 1306 and the content position moving unit 1308 will be described by indicating the relation between the camera position and the displayed image of the content.

First, the positional relationship between the content and the camera in the timeline view and pizza view will be described with reference to FIG. 11 and FIG. 12. By considering consistency of FIG. 4 and FIG. 5, a case where the contents are pictures will be described as an example.

Figure 11:
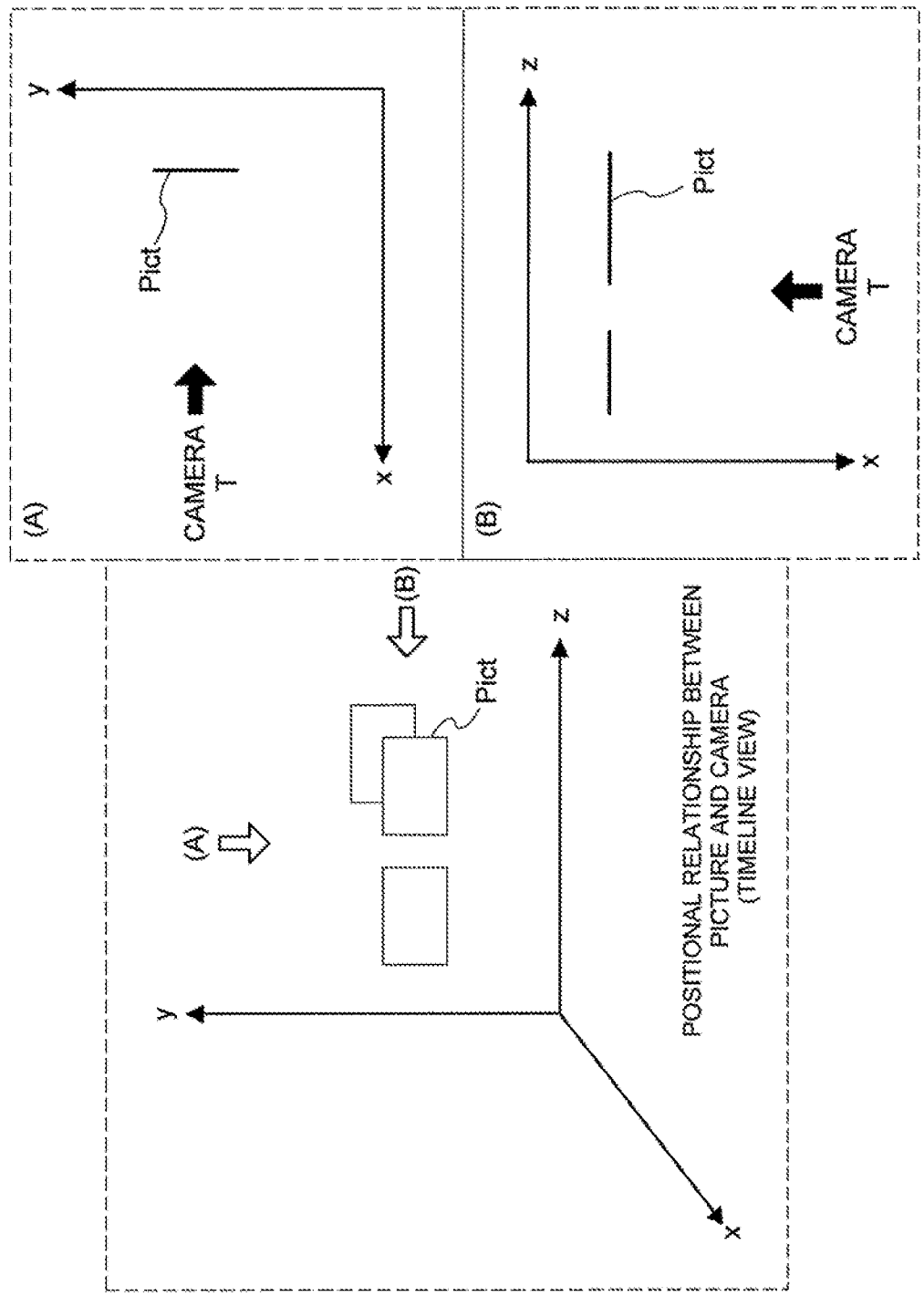
FIG. 11 is an explanatory diagram showing a modification method of a display area according to the embodiment.

FIG. 11 expresses a virtual solid space (x, y, z) corresponding to a display section. The x-axis, y-axis, z-axis directions correspond to the directions of the content display area 152 shown in FIG. 5. FIG. 11A shows an image in case where a picture disposed along a −y direction within the virtual space is observed. On the other hand, FIG. 11B shows an image in case where pictures disposed along a −z direction within the virtual space is observed. In case of the timeline view, it is assumed that the camera (hereinafter referred to camera T) is installed along a −x direction as shown in FIGS. 11A and 11B.

Figure 12:
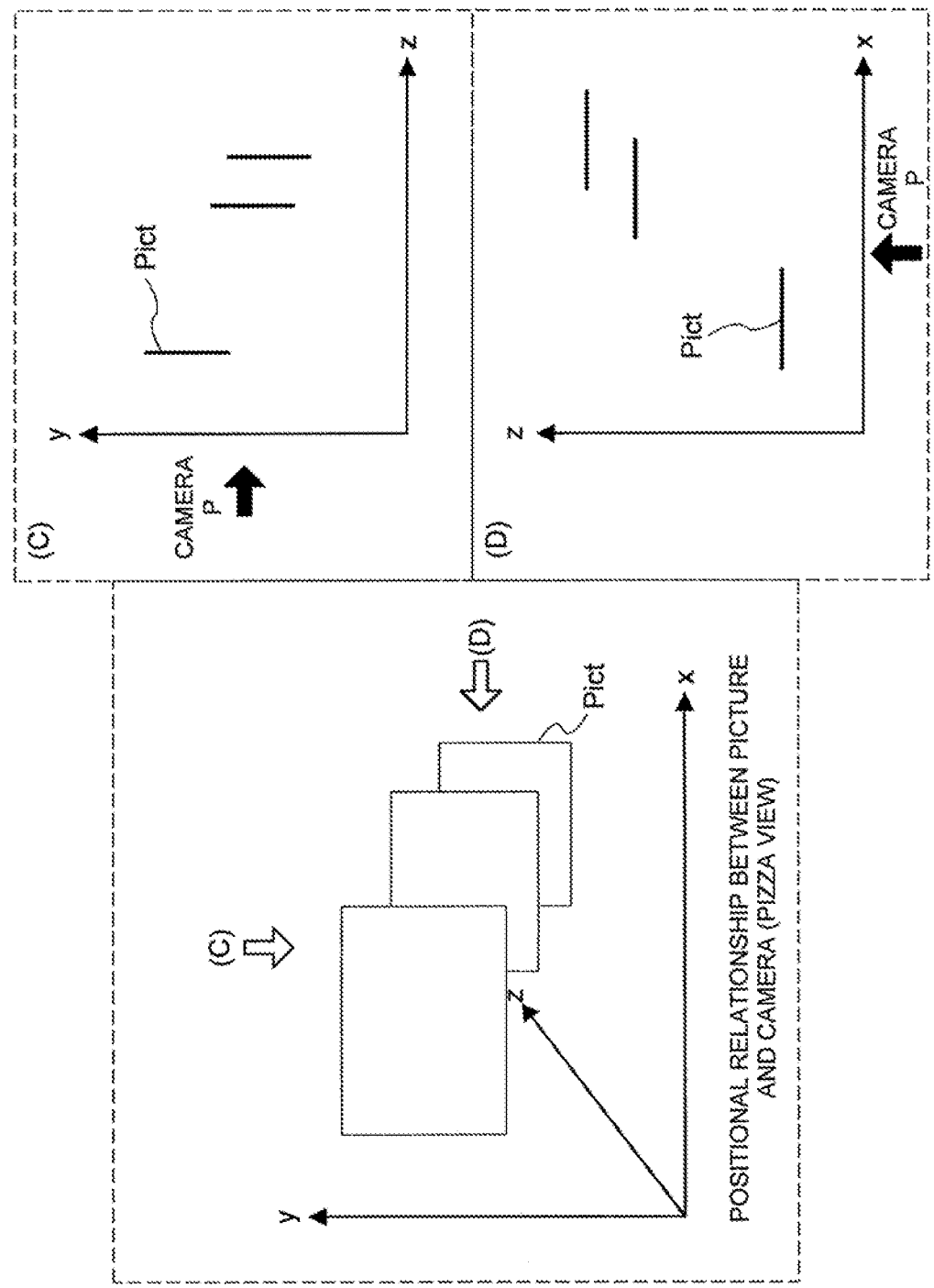
FIG. 12 is an explanatory diagram showing a modification method of a display area according to the embodiment.

FIG. 12 expresses a virtual solid space (x, y, z) corresponding to a display section. The x-axis, y-axis, z-axis directions correspond to the directions of the content display area 152 (the depth direction is the z-axis direction) as shown in FIG. 4. FIG. 12A shows an image in case where a picture disposed along the −x direction within the virtual space is observed. On the other hand, FIG. 12B shows an image in case where a picture disposed along the −y direction within the virtual space is observed. In case of the pizza view, it is assumed that the camera (hereinafter referred to as camera P) is installed along the z-axis direction as shown in FIGS. 12A and 12B.

Based on the above-described positional relation between the camera and picture, a method for changing the display style from timeline view to pizza view will be described. A method for changing the display style from pizza view to timeline view is achieved in the same manner.

First, the camera position moving unit 1306 moves the camera directed to the −x direction to the z direction. As described above, actually, the camera position moving unit 1306 changes the position of the viewpoint which serves as a standard when the position of the content is moved. That is, the camera position moving unit 1306 rotates the display screen by 90 degrees about the y-axis so that the x-y face is directed to the front face of the display screen 150. As evident by comparing FIG. 11 with FIG. 12, only the side face of a picture opposed to the position of the camera T is observed when the viewpoint is moved from the position of the camera T to the position of the camera P. Thus, the content position moving unit 1308 rotates the direction of the picture by 90 degrees about the y-axis so that each picture is opposed to the camera P.

A picture displayed such that it is shifted in the y direction or x direction is moved to its original position by the content position moving unit 1308. Of pictures displayed overlapping in the z-axis direction, the positions of pictures located forward or backward is adjusted so that the picture located backward is not covered by the picture located forward. In the meantime, these moving/adjusting processings may be executed at the same time. Processings by the camera position moving unit 1306 and the content position moving unit 1308 may be advanced at the same time.

Hereinafter, the functional configuration of the display style changing unit 130 according to this embodiment and the changing method for the display style have been described. The changing processing of the display style is executed when the display changing tab 166 displayed in the content display area 152 is clicked. In the meantime, the reference time is conveyed between before and after the changing processing for the display style. The configuration of the display screen in a process of changing the display style is as shown in FIG. 13. As shown in FIG. 13, the reference time display area 158 fades out so that the position and shape of each border area 160 are changed. However, the positional relationship between each display section and a content displayed therein is maintained. Accordingly, user can continue to grasp a unity of the contents on the time base naturally.

Second Embodiment

Next, the second embodiment according to the present invention will be described. The detailed description of any constituent elements having substantially the same functional configuration as the first embodiment is omitted. This embodiment is different from the first embodiment in that part of the functions possessed by the information processing apparatus 100 according to the first embodiment is presented as web application. That is, when art according to this embodiment is used, the functional configuration according to each of the above respective display styles and the functional configuration of transition processing between the respective display styles are executed by an application server 500 described later.

[System Configuration]

Figure 14:
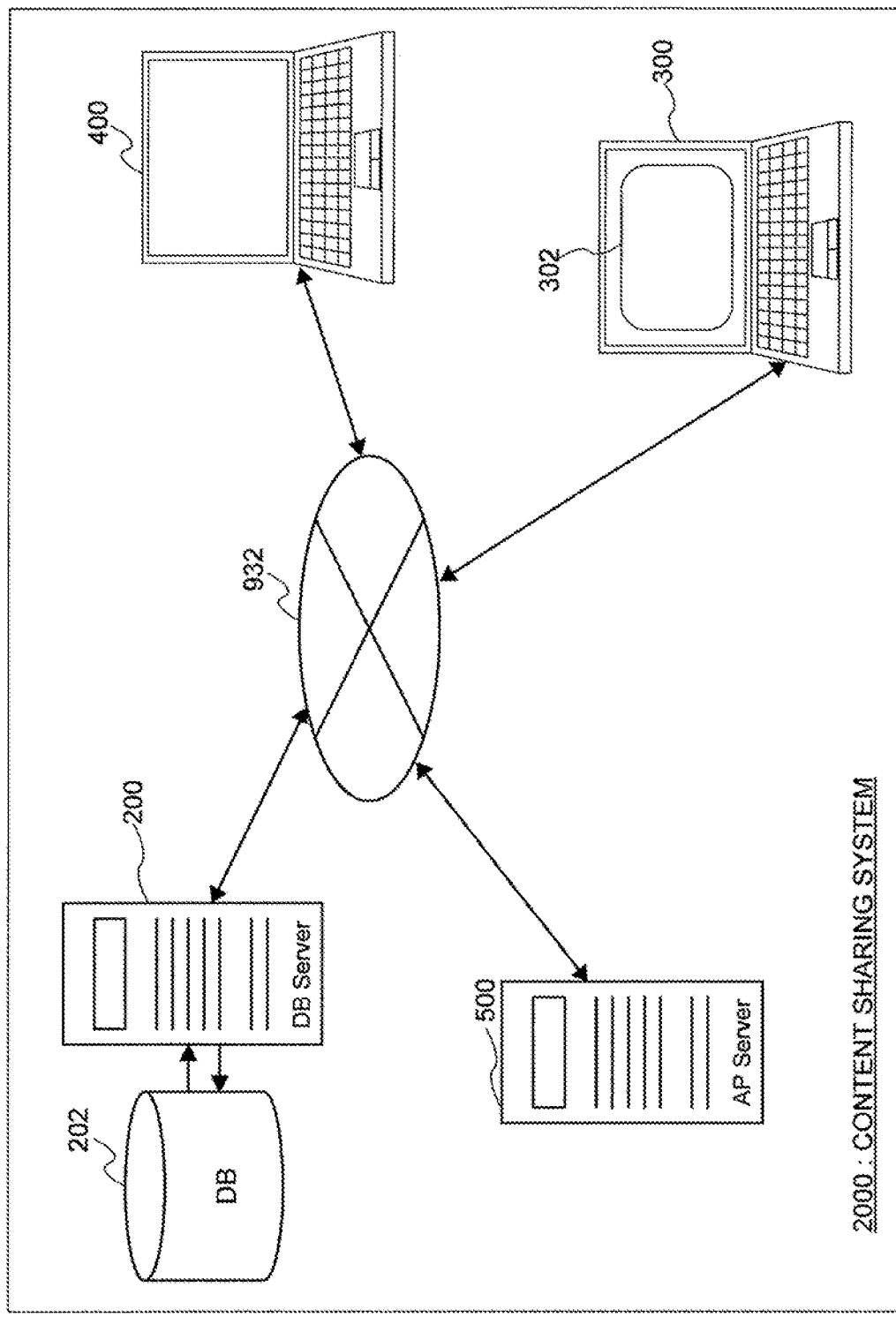
FIG. 14 is an explanatory diagram showing a system configuration of a content sharing system according to a second embodiment of the present invention.

First, the system configuration of a content sharing system 2000 according to this embodiment will be described with reference to FIG. 14. FIG. 14 is an explanatory diagram showing the system configuration of the content sharing system 2000 according to this embodiment.

As shown in FIG. 14, the content sharing system 2000 is configured of mainly the database server 200, the plurality of information processing apparatuses 300, 400 and the application server 500. The database server 202, which is built in a storage device provided inside or outside, is connected to the database server 200. Further, the information processing apparatus 300 includes a web browser 312.

(Application Server 500)

The application server 500 presents part of the function possessed by the information processing apparatus 100 according to the first embodiment as a web application. The functional configuration of the application server 500 is substantially the same as the functional configuration of the information processing apparatus 100 shown in FIG. 2. A user input by the operation interface 128 or the like is replaced with an operation signal from the information processing apparatus 300 or the like input through the communication unit 112. The display processing by the content display unit 126 and the display processing by the comment display unit 132 are replaced with a processing for displaying on the web browser 312 such as the information processing apparatus 300 through the communication unit 112. In the meantime, the function of the application server 500 may be incorporated in the database server 200.

[Specific Display Screen Configuration]

Figure 15:
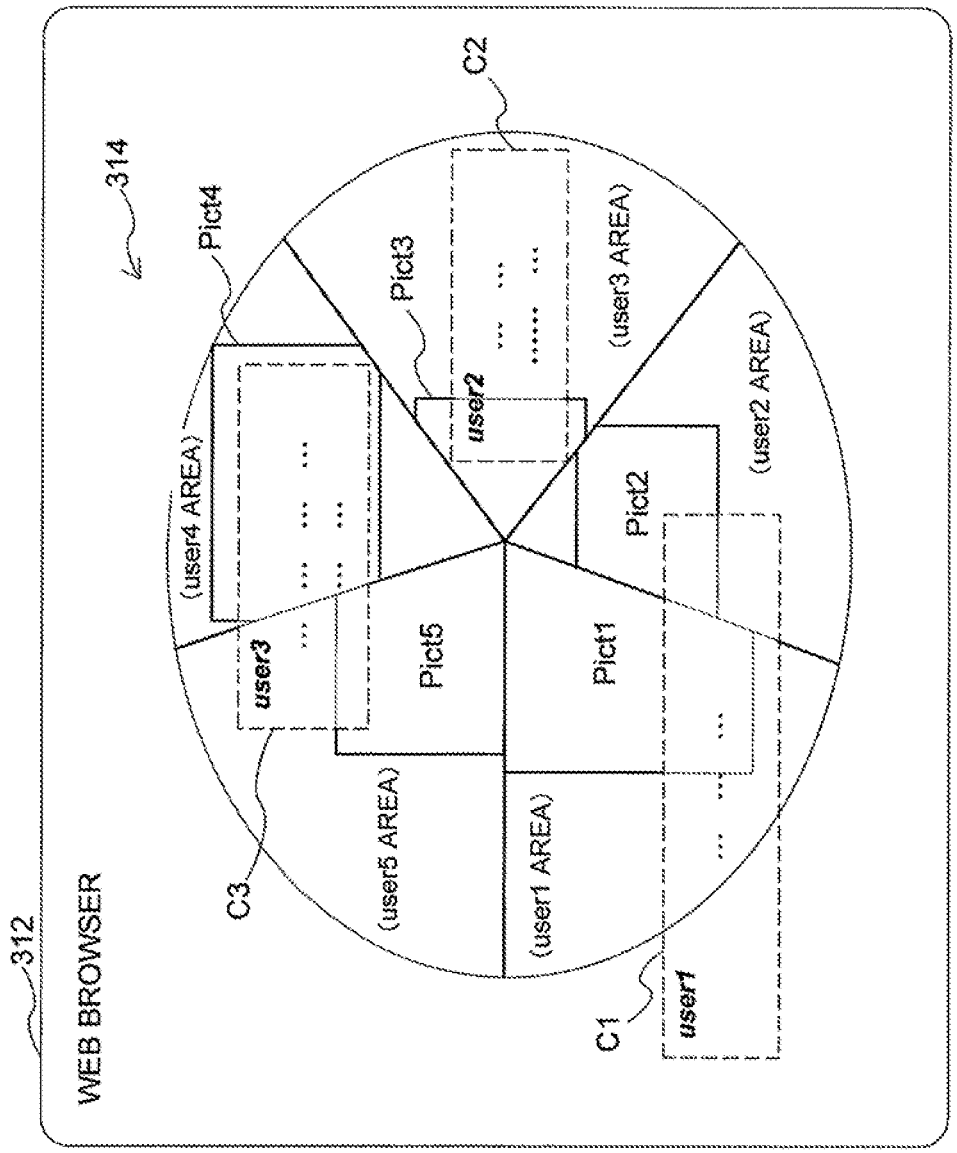
FIG. 15 is an explanatory diagram showing an example of the display screen according to the embodiment.

Here, the configuration of the specific display screen represented in the web browser 312 possessed by the information processing apparatus 300 will be described briefly with reference to FIG. 15. FIG. 15 is an explanatory diagram showing an example of the display screen configuration according to this embodiment.

As shown in FIG. 15, the browser display area 314 having a plurality of areas sectioned for each group are displayed in the web browser 312. In the example of FIG. 15, respective users have each group and each user area is displayed. In this example, a plurality of comment display areas (C1, C2, C3) are displayed such that they are overlapped in the user areas. Further, pictures (Pict1, Pict2, Pict3, Pict4, Pict5) are displayed as the content in each user area.

This web application allows user to execute operations for selection of pictures, changing of the reference time (not shown) and the like. The mouse connected to the information processing apparatus 300 is used for the operations. For example, if a picture is clicked with the mouse, the clicked picture is selected and the reference time is set as the picture taking time of the selected picture. Then, a picture at substantially the same picture taking time as the reference time is displayed on the forward surface. If an operation object (not shown) displayed on the web browser 312 is operated, feed/return processing of the reference time is executed. Further, automatic feeding function is provided by a predetermined operation.

The second embodiment according to the present invention has been described above. Because the function thereof is achieved in a form of the web application, user does not need to install any special application to a user terminal, thereby utilizing application more easily.

As described above, by applying the art according to the above embodiments, contents controlled dividedly for each group can be viewed by comparing the contents between the groups easily. By displaying the contents using a perspective such that the time axis is set in the depth direction like pizza view, a perspective on the time base can be grasped intuitively. By display control using the automatic feeding function, scenes are displayed as a stream like a revolving lantern in case of the pizza view, so that user can remember a memory at the time when a corresponding content is acquired vividly. Because comments are shared among users, the system proposed by present invention can be used as a communication tool through sharing of the contents as a key. User does not only enjoy by viewing comments attached to pictures but also use the comment as a bookmark in order to retrieve any pictures based on the content of contents and acquire information which can hardly be acquired through nothing but the picture.

[Hardware Configuration]

Figure 16:
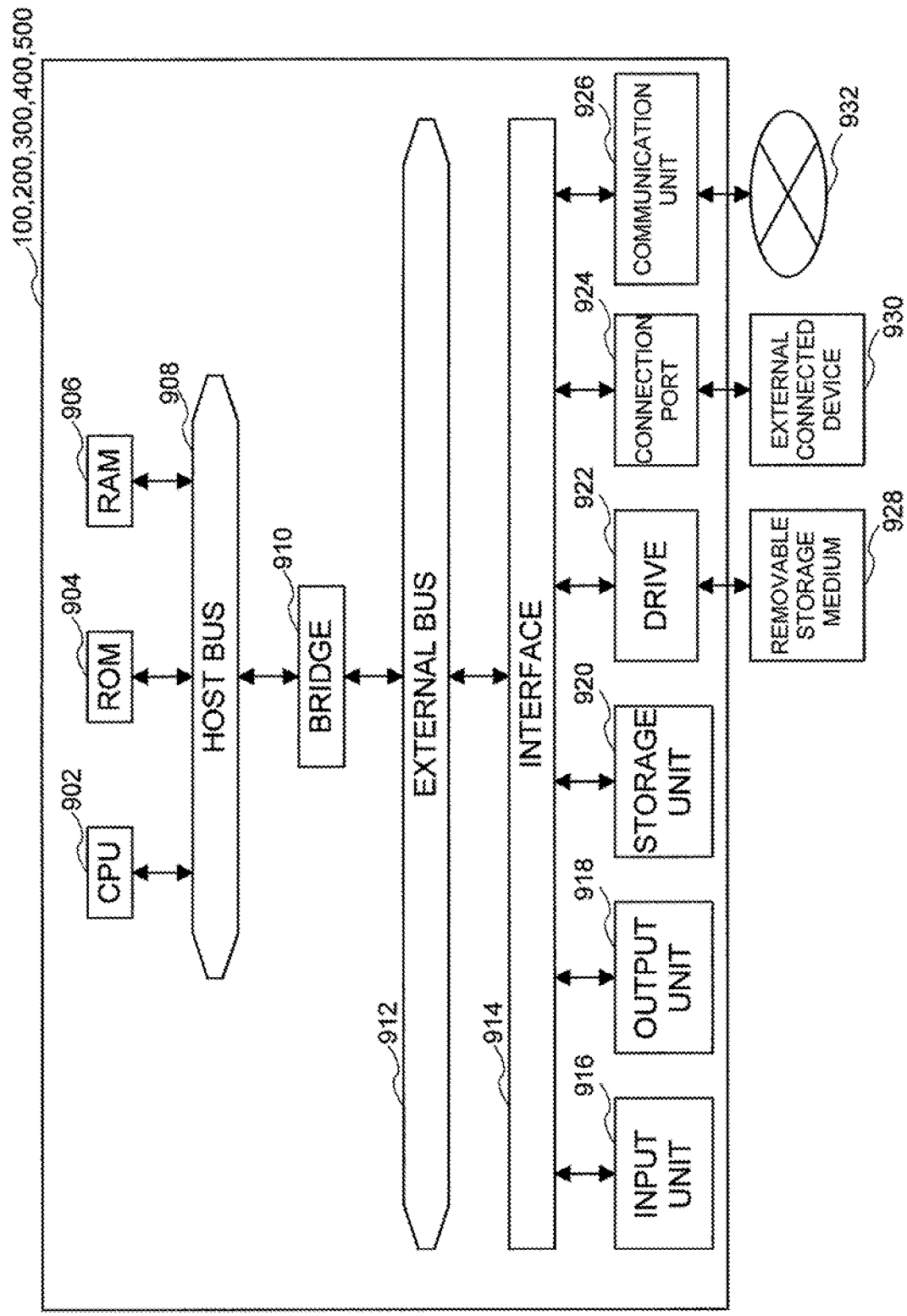
FIG. 16 is an explanatory diagram showing an example of hardware configuration according to an embodiment of the present invention.

The functions of the constituent elements held by the terminal can be realized by an information processing apparatus having, for example, a hardware configuration shown in FIG. 16. FIG. 16 is a diagram for explaining a hardware configuration of an information processing apparatus which can realize the functions held by the constituent elements of the apparatus.

As shown in FIG. 16, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design and other factors insofar as they are within the scope of the appended claims or the equivalents thereof.

Although in the above description, the present invention has been described by exemplifying the group of each user, the embodiments according to the present invention are not limited to the above described ones. For example, the contents may be grouped in the unit of department, company, local area, circle or the like. These groups may be groups generated dynamically using metadata attributed to the content such as pictures as well as groups allocated statically to each content. In the meantime, the content to which the art according to the present invention can be applied includes every contents which can be expressed visually such as moving pictures in addition to the picture exemplified in the above description.

What is claimed is:

1. A display device for displaying a plurality of contents in first and second predetermined display areas comprising:
   a content acquiring unit configured to acquire the contents;
   a content arranging unit configured to arrange the contents based on time information possessed by the contents;
   a time difference calculating unit configured to calculate a time difference between adjacent contents in terms of time based on the time information possessed by the contents;
   a display position setting unit configured to set a position of each content along a time axis based on the time difference between the contents, the display position setting unit determining whether the time difference between the contents is larger than a predetermined value;
   a content display unit configured to:
      display the plurality of contents in the first predetermined display area based on position information on the time axis along a depth direction and;
      display the plurality of contents in the second predetermined display area based on positional information on the time axis along a horizontal direction; and
   a display style changing unit configured to modify the configuration of the contents from the first predetermined display area to the second predetermined display area and from the second predetermined display area to the first predetermined display area seamlessly such that the positional relationship among the contents displayed in the first predetermined display area is the same of the positional relationship among the contents displayed in the second predetermined display area;
   wherein if the time difference is larger than a predetermined value, the display position setting unit accumulates the time differences and stores the accumulation amount as an offset amount; and
   wherein the content display unit initially displays the contents at a shorter time interval than an interval corresponding to the time difference; and
   wherein if the time difference is smaller than the predetermined value, the content display unit initially displays the contents at a longer time interval than an interval corresponding to the time difference.

2. The display device according to claim 1, wherein, when the plurality of contents are divided to a plurality of groups, the content display unit displays the plurality of contents corresponding to the groups along the depth direction of the first predetermined display area provided for each group based on a time axis common among the groups.

3. The display device according to claim 2, further comprising a gravity center calculating unit which calculates the gravity center of the content, wherein
   the content display unit displays the content so that the gravity center of the content calculated by the gravity center calculating unit agrees with the gravity center of each of the first and second predetermined display areas.

4. The display device according to claim 2, wherein the content display unit displays the content in a smaller size as the time difference is increased.

5. A display method for displaying a plurality of contents in first and second predetermined display areas, comprising the steps of:
   acquiring the contents;
   arranging the contents based on time information possessed by the contents;
   calculating a time difference between the adjacent contents in terms of time based on the time information possessed by the contents;
   setting a distance of each content along a time axis based on the time difference between the contents;
   determining whether the time difference between the contents is larger than a predetermined value;
   displaying the plurality of contents of the first predetermined display based on position information on the time axis along a depth direction;
   displaying the plurality of contents of the second predetermined display based on position information on the time axis along a horizontal direction of the second predetermined display area; and
   modifying the configuration of the contents from the first predetermined display area to the second predetermined display area and from the second predetermined display area to the first predetermined display area seamlessly such that the positional relationship among the contents displayed in the first predetermined display area is the same of the positional relationship among the contents displayed in the second predetermined display area;
   wherein if time difference is larger than a predetermined value, accumulating the time differences and storing the accumulation amount as an offset amount; and
   initially displaying the contents at a shorter time interval than an interval corresponding to the time difference; and
   if the time difference is smaller than the predetermined value, initially displaying the contents at a longer time interval than an interval corresponding to the time difference.

6. A non-transitory computer readable storage medium storing a program, which when executed by a computer performs a method of displaying a plurality of contents in first and second predetermined display areas, the method comprising:

acquiring the contents;

arranging the contents based on time information possessed by the contents;

calculating a time difference between the adjacent contents in terms of time based on the time information possessed by the contents;

setting a distance of each content along a time axis based on the time difference between the contents;

determining whether the time difference between the contents is larger than a predetermined value;

displaying the plurality of contents of the first predetermined display area based on position information on the time axis along a depth direction;

displaying the plurality of contents of the second predetermined display area based on position information on the time axis along a horizontal direction; and modifying the configuration of the contents from the first predetermined display area to the second predetermined display area and from the second predetermined display area to the first predetermined display area seamlessly such that the positional relationship among the contents displayed in the first predetermined display area is the same of the positional relationship among the contents displayed in the second predetermined display area;

wherein if time difference is larger than a predetermined value, accumulating the time differences and storing the accumulation amount as an offset amount; and initially displaying the contents at a shorter time interval than an interval corresponding to the time difference; and if the time difference is smaller than the predetermined value, initially displaying the contents at a longer time interval than an interval corresponding to the time difference.

7. The display device according to claim 1, wherein the first predetermined display area includes a plurality of display areas sectioned by a plurality of border areas extending radially from a central reference time display area.

8. The display device according to claim 7, wherein the first predetermined display area includes a comment display area configured to display comments written by a plurality of users.

9. The display device according to claim 7, wherein the first predetermined display area includes a display changing tab for changing the first predetermined display area to the second predetermined display area.

10. The display device according to claim 1, wherein the second predetermined display area includes a plurality of display areas sectioned by a plurality of border areas arranged in parallel in a vertical direction and a reference line indicating the reference time on the time axis extending in the horizontal direction.

11. The display device according to claim 10, wherein the second predetermined display area includes a comment display area configured to display comments written by a plurality of users.

12. The display device according to claim 11, wherein the second predetermined display area includes a display changing tab for changing the second predetermined display area to the first predetermined display area.

* * * * *